United States Patent
Xue et al.

(10) Patent No.: US 12,373,985 B2
(45) Date of Patent: Jul. 29, 2025

(54) POSITIONING METHOD AND APPARATUS, DEVICE, AND STORAGE MEDIUM

(71) Applicant: Beijing Zitiao Network Technology Co., Ltd., Beijing (CN)

(72) Inventors: Zhou Xue, Beijing (CN); Hanzhen Li, Beijing (CN); Xu Chang, Beijing (CN); Junliang Shan, Beijing (CN); Yongjie Zhang, Beijing (CN); Xin Wang, Beijing (CN); Tao Wu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/456,413

(22) Filed: Aug. 25, 2023

(65) Prior Publication Data
US 2024/0070913 A1 Feb. 29, 2024

(30) Foreign Application Priority Data

Aug. 25, 2022 (CN) .......................... 202211026531.9
Sep. 26, 2022 (CN) .......................... 202211177542.7

(51) Int. Cl.
*G06T 7/73* (2017.01)
*G06F 3/03* (2006.01)

(52) U.S. Cl.
CPC .............. *G06T 7/74* (2017.01); *G06F 3/0325* (2013.01); *G06T 2207/20081* (2013.01); *G06T 2207/20084* (2013.01)

(58) Field of Classification Search
CPC ............. G06T 7/74; G06T 2207/20081; G06T 2207/20084; G06F 3/0325
See application file for complete search history.

(56) References Cited

U.S. PATENT DOCUMENTS 10,852,839 B1 * 12/2020 Ravasz .................. G06F 3/017
10,984,242 B1 * 4/2021 Atlas ..................... G06F 3/0346
(Continued)

FOREIGN PATENT DOCUMENTS

CN 108267715 A 7/2018
CN 110262667 A 9/2019
(Continued)

OTHER PUBLICATIONS

Zhou, Q. et al., "Is Geometry Enough for Matching in Visual Localization?," arXiv:2203.12979v1, Mar. 24, 2022, 16 pages.
(Continued)

*Primary Examiner* — Ariel A Balaoing
(74) *Attorney, Agent, or Firm* — Alleman Hall & Tuttle LLP

(57) ABSTRACT

Embodiments of the present disclosure provide a positioning method and apparatus, a device, and a storage medium, the method is applied to a wearable display device, where the wearable display device includes a display host and a peripheral, the display host and/or the peripheral are used for projecting a structure light image onto an object in a real environment, and the method includes: acquiring an image obtained by the display host shooting the object, and an image obtained by the peripheral shooting the object; and determining, according to image obtained by shooting and the structure light image, a pose of the peripheral relative to the display host.

18 Claims, 9 Drawing Sheets

(56) References Cited

U.S. PATENT DOCUMENTS

| | | | |
|---|---|---|---|
| 11,127,215 B1* | 9/2021 | Narvaez | G09G 3/001 |
| 11,797,083 B2* | 10/2023 | Wu | H04N 23/74 |
| 2006/0256081 A1* | 11/2006 | Zalewski | G06F 3/0325 |
| | | | 345/156 |

FOREIGN PATENT DOCUMENTS

| | | |
|---|---|---|
| CN | 111949123 A | 11/2020 |
| CN | 112181138 A | 1/2021 |

OTHER PUBLICATIONS

Campbell, D. et al., "Solving the Blind Perspective-n-Point Problem End-To-End With Robust Differentiable Geometric Optimization," arXiv:2007.14628v2, Sep. 8, 2020, 18 pages.

Liu, L. et al., "Learning 2D-3D Correspondences to Solve the Blind Perspective-n-Point Problem," arXiv:2003.06752v, Mar. 15, 2020, 24 pages.

Guangdong, K., "YVR Share: How to achieve industry-leading VR joystick positioning technology," OVALICS, Available Online at https://news.nweon.com/96254, Apr. 18, 2022, 2 pages. Submitted with partial English translation.

* cited by examiner

POSITIONING METHOD AND APPARATUS, DEVICE, AND STORAGE MEDIUM

CROSS-REFERENCE TO RELATED APPLICATION

This application claims priority to Chinese Patent Application No. 202211026531.9, filed on Aug. 25, 2022, and Chinese Patent Application No. 202211177542.7, filed on Sep. 26, 2022. All of the aforementioned patent applications are hereby incorporated by reference in their entireties.

TECHNICAL FIELD

Embodiments of the present disclosure relate to the field of computer technologies and, in particular, to a positioning method and apparatus, a device, and a storage medium.

BACKGROUND

With the continuous development of computer technologies, wearable display devices such as VR (Virtual Reality) devices have been increasingly widely used. In general, VR devices include VR helmets and handles, VR helmets can provide users with corresponding visual images based on poses of handles, and can create an immersive experience environment for users.

In order to better achieve man-machine interaction capabilities, how to determine the pose of the handle has become a key issue. In related art, a plurality of infrared light balls may be installed on the handle, the handle may be shot by the VR helmet, and the pose of the handle may be determined based on a position of the infrared light ball in the image obtained by shooting.

SUMMARY

Embodiments of the present disclosure provide a positioning method and apparatus, a device, and a storage medium, so as to solve a positioning problem of a peripheral of the wearable display devices.

In a first aspect, an embodiment of the present disclosure provides a positioning method, the method is applied to a wearable display device including a display host and a peripheral, where the display host and/or the peripheral are used for projecting a structure light image onto an object in a real environment, and the method includes:
  acquiring an image obtained by the display host shooting the object, and an image obtained by the peripheral shooting the object; and
  determining, according to image obtained by shooting and the structure light image, a pose of the peripheral relative to the display host.

In a second aspect, an embodiment of the present disclosure provides a positioning method, the method is applied to any device in a display host and a peripheral, where the device is used for projecting a structure light image onto an object in a real environment, and the method includes:
  acquiring a first image obtained by the device shooting the object, and auxiliary information sent by another device in the display host and the peripheral, where the auxiliary information includes: a second image obtained by another device shooting the object, or two-dimensional position information of at least part of spatial position of multiple spatial positions in the second image;
  determining, according to the first image, the auxiliary information, and the structure light image, a pose of the peripheral relative to the display host;
  where the multiple spatial positions are multiple spatial positions correspond to multiple light patterns in the structure light image projected onto a surface of the object.

In a third aspect, an embodiment of the present disclosure provides a positioning method, the method is applied to any device in a display host and a peripheral, and the method includes:
  acquiring a second image obtained by the device shooting an object in a real environment, where another device in the display host and peripheral is used for projecting a structure light image onto the object;
  sending auxiliary information to another device, where the auxiliary information includes: the second image, or two-dimensional position information of at least part of spatial position of multiple spatial positions in the second image, to enable another device to determine a pose of the peripheral relative to the display host according to the first image shot by another device, the auxiliary information, and the structure light image;
  where the multiple spatial positions are multiple spatial positions correspond to multiple light patterns in the structure light image projected onto a surface of the object.

In a fourth aspect, an embodiment of the present disclosure provides a positioning apparatus, the apparatus is applied to a wearable display device including a display host and a peripheral, where the display host and/or the peripheral are used for projecting a structure light image onto an object in a real environment, and the apparatus includes:
  a first acquiring module, configured to acquire an image obtained by the display host shooting the object, and an image obtained by the peripheral shooting the object; and
  a first determining module, configured to determine, according to image obtained by shooting and the structure light image, a pose of the peripheral relative to the display host.

In a fifth aspect, an embodiment of the present disclosure provides a positioning apparatus, the apparatus is applied to any device in a display host and a peripheral, where the device is used for projecting a structure light image onto an object in a real environment, and the apparatus includes:
  a second acquiring module, configured to acquire a first image obtained by the device shooting the object, and auxiliary information sent by another device in the display host and the peripheral, where the auxiliary information includes: a second image obtained by another device shooting the object, or two-dimensional position information of at least part of spatial position of multiple spatial positions in the second image;
  a second determining module, configured to determine, according to the first image, the auxiliary information, and the structure light image, a pose of the peripheral relative to the display host;
  where the multiple spatial positions are multiple spatial positions correspond to multiple light patterns in the structure light image projected onto a surface of the object.

In a sixth aspect, an embodiment of the present disclosure provides a positioning apparatus, the apparatus is applied to any device in a display host and a peripheral, and the apparatus includes:
  a third acquiring module, configured to acquire a second image obtained by the device shooting an object in a real environment, where another device in the display host and peripheral is used for projecting a structure light image onto the object;

a sending module, configured to send auxiliary information to another device, where the auxiliary information includes: the second image, or two-dimensional position information of at least part of spatial position of multiple spatial positions in the second image, to enable another device to determine a pose of the peripheral relative to the display host according to the first image shot by another device, the auxiliary information, and the structure light image;

where the multiple spatial positions are multiple spatial positions correspond to multiple light patterns in the structure light image projected onto a surface of the object.

In a seventh aspect, an embodiment of the present disclosure provides an electronic device, including: a memory and at least one processor;

the memory stores computer execution instructions; the at least one processor executes computer execution instructions stored in the memory to enable the at least one processor to execute the positioning methods described in the above first aspect, second aspect and third aspect.

In an eighth aspect, an embodiment of the present disclosure provides a computer readable storage medium, having computer execution instructions stored thereon, where when a processor executes computer execution instructions, the positioning methods described in the above first aspect, second aspect and third aspect are implemented.

In a ninth aspect, an embodiment of the present disclosure provides a computer program product, including: computer programs, where when the computer programs are executed by a processor, the positioning methods described in the above first aspect, second aspect and third aspect are implemented.

The positioning method and apparatus, the device, and the storage medium provided in the embodiments of the present disclosure may project a structure light onto an object in a real environment through a display host or peripheral in a wearable display device, and acquire an image obtained by the display host shooting the object, and an image obtained by the peripheral shooting the object, determine, according to image obtained by shooting, a pose of the peripheral relative to the display host, so that the pose can be directly solved by projecting and shooting the image, without installing a large number of infrared light balls on the peripheral for auxiliary positioning, which simplifies the structure of the peripheral, effectively reduces costs, and facilitates a miniaturization of the peripheral, improves a user experience.

BRIEF DESCRIPTION OF DRAWINGS

In order to explain the embodiments of the present disclosure or the technical solutions in the related art more clearly, the drawings needed to be used in the embodiments or the description of the related art will be introduce briefly in the following. Obviously, the drawings in the following description are some embodiments of the present disclosure. For those skilled in the art, other drawings can be obtained from these drawings without paying creative labor.

DESCRIPTION OF EMBODIMENTS

Figure 1:
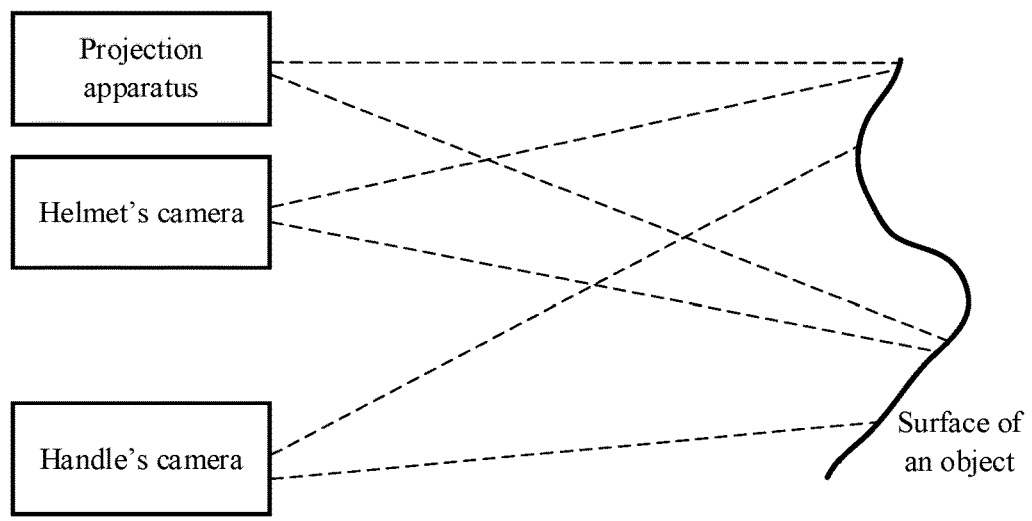
FIG. 1 is an application scenario diagram provided by one or more embodiments of the present disclosure.

To make the purposes, technical solutions and advantages of embodiments of the present disclosure more clearly, the technical solutions in the embodiments of the present disclosure are clearly and completely described in the following with reference to the accompanying drawings of the embodiments of the present disclosure. Obviously, the described embodiments are part of embodiments of the present disclosure, not all embodiments. Based on the embodiments of the present disclosure, all other embodiments obtained by those skilled in the art without creative effort are all within the protection scope of the present disclosure.

Embodiments of the present disclosure may be used to detect a relative pose of two components in a device, especially applicable to wearable display devices, such as virtual reality (VR) devices, augmented reality (AR) devices, mixed reality (MR) devices, extended reality (XR) devices, etc. Extended reality devices refer to terminals that achieve extended reality effects, usually in a form of glasses, head mount display (HMD), and contact lenses, which are used for achieving a visual perception and other forms of perception.

In extended reality devices, it is often necessary to set up a positioning system to meet the needs of human-computer interaction. A main task of the positioning system (including a positioner and a positioning technique) is to provide a position, a direction, and displacement information of tracking targets in three-dimensional real space to the extended reality system in a high-precision, low latency, and low computational complexity manner, and then present it in an extended real space. Tracking targets refer to objects used to interact with extended reality devices, such as the hands and feet of extended reality device wearers, and peripherals held by extended reality device wearers.

At present, a main tracking-positioning technology is to use cameras, ultrasonic sensors, and electromagnetic emission coils for distance measurement and positioning of peripherals. These tracking-positioning technologies require a display host and a handle peripheral to be equipped with transmitting and receiving modules, respectively. The signals emitted by the transmitting module propagate along a straight line, directly reaching the receiving module and being received by the receiving module. This type of action capture manner has the following problems: first, it is limited by a field of view (FOV) and has a blind spot for tracking. Within the blind spot for tracking, it is not possible to locate and track the handle peripherals. Second, if the distance between the display host and the handle peripheral is too far, the signal sent by the transmitting module will be severely attenuated, resulting in a very low signal strength received by the receiving module, making it impossible to locate and track the handle peripheral. Third, if there are objects between the display host and the handle peripheral that prevent the transmission of signals transmitted by the transmission module, it will be impossible to locate and track the handle peripheral.

For the convenience of description, an implementation principle of an embodiment of the present disclosure will be illustrated by taking the VR devices as an example in the following.

The VR devices usually include wearable display hosts such as VR helmets or VR glasses, which are used to display images to users. In order to achieve image control, corresponding peripherals such as handles are usually configured. The pose of the handle may affect the image that the user sees. For example, after opening a menu interface, users can use the handle to select options in a menu; during a game, users may adjust actions or positions of virtual objects in the game by moving the handle. Therefore, real-time detection of the pose of the handle is an important task for VR devices.

The existing handle pose detection is achieved usually based on actively emitting infrared light balls. Specifically, there is a large circular structure above the handle, which may add a circle of infrared light balls, and the light balls remain lit when a helmet's camera is in shooting state. By observing the light balls through the helmet's camera, the handle positioning may be achieved.

Although the above method can achieve handle positioning, since the handle positioning is achieved through light balls, the number of light balls is directly related to a precision of positioning. Generally, the more the number of light balls, the higher the precision. In a situation of ensuring detection precision, it is difficult to achieve a miniaturization of the handle, resulting in a poor user experience and a high cost. Moreover, the positioning of the handle relies on the helmet's observation of the handle, and a motion range of the handle is constrained within the field of view of the helmet's camera, further reducing the user experience.

In view of this, an embodiment of the present disclosure provides a positioning method that can set up a projection apparatus in the device to determine the pose of the handle by projecting structure light onto real objects and shooting the objects, thereby canceling the infrared light ball.

FIG. 1 is an application scenario diagram provided by one or more embodiments of the present disclosure. As shown in FIG. 1, a projection apparatus installed on the helmet can project a structure light onto an object in a real environment, the structure light has a specific form, such as evenly distributed grids or stripes. After the structure light is projected onto the object, images are shot by a helmet's camera and a handle's camera, and the images reflect brightness changes formed by the structure light on the surface of the object. Since a surface of an object is usually undulating, it can cause certain deformations of stripes or grids projected onto the object, thereby the camera's pose may be determined.

Figure 2:
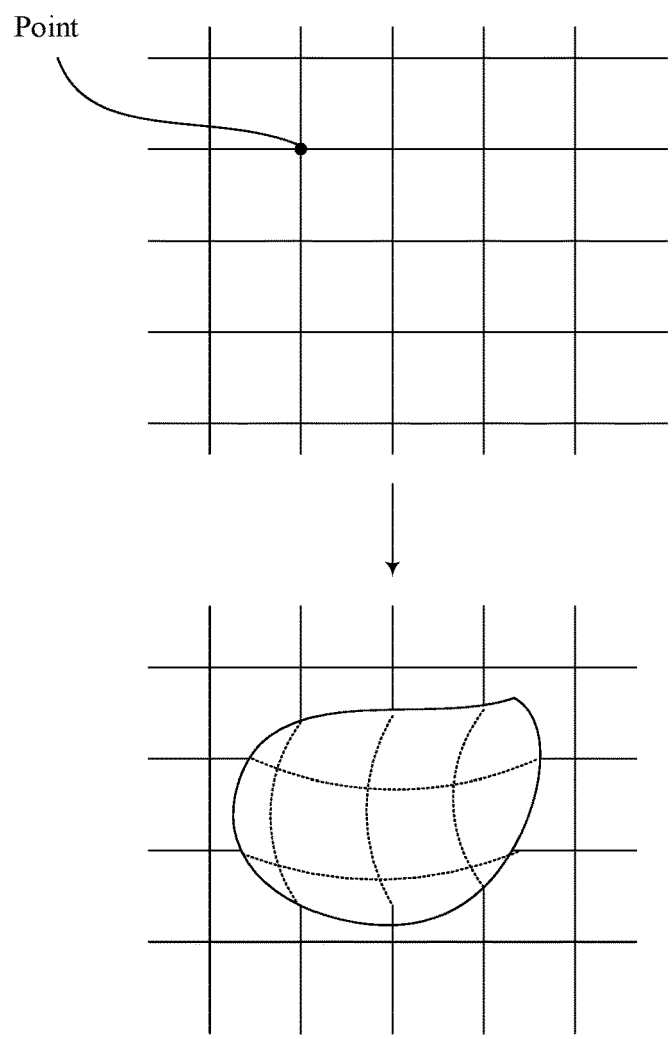
FIG. 2 is a schematic diagram of a comparison between a structure light image and a shooting image provided by one or more embodiments of the present disclosure.

FIG. 2 is a schematic diagram of a comparison between a structure light image and a shooting image provided by one or more embodiments of the present disclosure. As shown in FIG. 2, a structure light projected by the projection apparatus is a uniform grid, and after being projected onto a surface of an object, the grid will has a certain deformation. The surface undulation of an object varies, and the deformation of the mesh also varies. Therefore, when a relative position of the projection apparatus and the helmet are known, by comparing the projected structure light with the images shot by the helmet camera, the position of the points on the object surface in space may be determined, that is, three-dimensional coordinates of spatial points in a helmet camera coordinate system. At the same time, the image shot by the handle camera reflects an object situation observed from the position of the handle, which is equivalent to projection coordinates of the above spatial points in the image shot by the handle may be determined. When the structure light and object remain unchanged, different handle poses often result in different images shot by the handle, that is, the projection coordinates of the spatial points in the image shot by the handle are different. A relative position relationship between the handle and helmet may be solved through the three-dimensional coordinates and projection coordinates of the actual detected spatial points.

In summary, an embodiment of the present disclosure combines structure light with images shot by a helmet camera to construct three-dimensional spatial information of the object, and compares the images shot by the handle camera with them to calculate pose information of the handle relative to the helmet. Since the handle is no longer equipped with many infrared light balls, the structure of the handle is simplified, costs are reduced, and a miniaturization of the handle is achieved. And the positioning of the handle does not rely on the observation of the helmet on the handle, limitations on the movement range of the handle is small, the user experience is improved.

Some implementations of the present disclosure will be illustrated in detail in conjunction with the drawings. In the absence of conflicts between various embodiments, the following embodiments and the features in the embodiments may be combined with each other.

Figure 3:
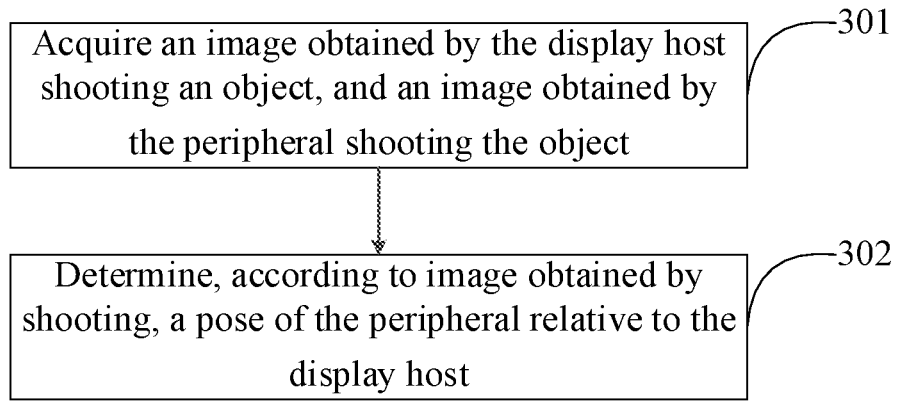
FIG. 3 is a flowchart of a positioning method provided by one or more embodiments of the present disclosure.

FIG. 3 is a flowchart of a positioning method provided by one or more embodiments of the present disclosure. The embodiment may be applied to a wearable display device, which may include a display host and a peripheral. The display host may be a wearable device on the user's body surface, especially on a head, to provide the user with a better visual experience, such as a helmet or glasses. The peripheral may be a handle or other peripheral that can assist the user in achieving control functions, such as a handheld or wearable sensing apparatus, and the like.

The display host is used to determine a signal output to the user based on a pose of the peripheral, for example, to determine a screen displayed to the user, or vibration signals, sound signals, etc. output to the user.

As shown in FIG. 3, the positioning method in the embodiment can include the following steps.

Step 301, acquire an image obtained by the display host shooting an object, and an image obtained by the peripheral shooting the object.

In an embodiment, before acquiring the shot image, the structure light image may be projected onto the object in a real environment. In an embodiment, the structure light image may be projected onto the object by the display host and/or the peripheral. The display host and/or the peripheral may be equipped with a projection apparatus, such as a projector, which can achieve the projection of structure light images.

In an embodiment, the structure light image may also be referred to as a structure light and may contain specific patterns such as stripes, grids, speckle, etc. The projection apparatus projects the structure light image onto the object, which may be understood as projecting a light beam corresponding to a specific pattern based on the structure light image. For example, if the specific pattern is a grid, the light beam with a grid shaped is projected. After the light beam shines on the object, it will form an effect of light and dark changes on the object, peripheral positioning may be assisted in achieving by observing the light and dark changes on a surface of the object.

The object in the real environment may be any object in the user's current environment, such as furniture, walls, etc.

In an embodiment, both the display host and the peripheral may be equipped with at least one camera, which can shoot objects to obtain corresponding images. The object may be a single object or multiple objects, such as the structure light image projected onto multiple furniture in a room, and cameras shoot multiple furniture to obtain corresponding images.

A shooting range of the camera in the display host, the shooting range of the camera in the peripheral, and a projection range of the projector may be the same or different, as long as there is a certain overlap among the three ranges. Therefore, the embodiment will not have significant limitations on an activity range of the peripheral, and a use process of the peripheral will be more flexible.

In an embodiment, a display host camera may be fixedly connected to a display host body, a peripheral camera may be fixedly connected to a peripheral body, and the projection apparatus may also be fixedly connected to the display host body or the peripheral body. In this way, a relative pose of the display host camera and the peripheral camera may be determined by projecting and the shot images, and the relative pose of the display host body and the peripheral body may naturally be determined.

Alternatively, the camera or projection apparatus may be movably connected to the corresponding body. For example, the peripheral camera may have a certain range of angle changes relative to the peripheral body, thereby achieving more flexible image shoot function without being constrained by fixed angles. The angle change may be achieved through a motor drive or other means. In this way, the relative pose of the display host camera and the peripheral camera may be determined by projecting and the shot images, and then combined with the relative pose between the peripheral camera and the peripheral body, the relative pose of the display host body and the peripheral body may be determined.

Step 302, determine, according to image obtained by shooting, a pose of the peripheral relative to the display host.

The pose may specifically include position and/or posture. The position may be represented by a position of a center point of the peripheral, or by an average of multiple endpoint positions of the peripheral. The posture may be expressed as an orientation of the peripheral, or a pitch angle, a yaw angle, a roll angle, etc. of the peripheral.

After obtaining the shot image, the position may be solved only, or the posture may be solved only, or the position and the posture may be solved simultaneously. In an embodiment, the specific content to be solved may be determined based on a current working mode of the wearable display device. For example, some games with wearable display devices only need to detect a location of the peripheral, and at this time, only the location of the peripheral may be solved, while the posture of the peripheral may not be solved, so as to save the workload.

In one example, the projected structure light image may be fixed, the image shot by the display host, the image shot by the peripheral, and the pose of the peripheral have a certain constraint relationship. The pose of the peripheral may be determined according to the image shot by the display host and the image shot by the peripheral.

In another example, the projected structure light image may be adjustable. For example, a detection precision requirement for the pose may be determined according to the current working mode of the wearable display device, and the structure light image to-be-projected may be determined according to the detection precision requirement for the pose. When the precision requirement are low, the structure light image may carry less information, such as reducing a density of the grid, to reduce an output power of the projection apparatus and a solving workload, and save resources.

In a situation of the structure light image is adjustable, the pose of the peripheral may be determined according to the image shot by the display host, the image shot by the peripheral, and the structure light image.

In a practical application, in order to improve an observation effect of the structure light, the projection of the structure light may be achieved by using the projection apparatus with a high power, such as lasers, and the emission power of the projection apparatus may also be improved according to a current ambient light. Alternatively, the projected structure light may be light with a specific band, filters are added to the display host camera and the peripheral camera to allow specific band of light to pass through, thereby reducing interference from ambient light.

In summary, the positioning method provided in the embodiment, the structure light may be projected onto the object in the real environment through the display host or the peripheral in the wearable display device, the image obtained by the display host shooting the object is acquired, and the image obtained by the peripheral shooting the object is acquired. The pose of the peripheral relative to the display host may be determined according to the shot image. Thus, the pose may be directly solved by projecting and shooting images, and there is no need to install many infrared light balls on the peripheral for auxiliary positioning, thereby simplifying the structure of the peripheral, effectively reducing a cost, facilitating a miniaturization of the peripheral, and improving a user experience.

In practice, there are various methods for implementing step 302, and which is not limited in the present disclosure. Exemplarily, a method for implementing step 302 may include the following steps a to g.

step a, match a first image and a second image to determine N groups of feature points with matching relationships, where each group of feature points includes a first feature point located in the first image and a second feature point located in the second image; the first feature point and the second feature point in each group of feature points correspond to a same reference point, and different groups of feature points correspond to different reference points.

The structure light image includes N light spots; the N light spots include N reference points, and N is a positive integer greater than or equal to 3; the first feature point is an image of the reference point corresponding to the first feature point in the first image; the second feature point is an image of the reference point corresponding to the second feature point in the second image; and the first image is an image shot by a device used for projecting the structure light image in the display host and the peripheral, and the second image is an image shot by another device.

Step b, determine, based on position information of a respective first feature point in the first image, first position information of the reference point corresponding to the respective first feature point in a display host coordinate system.

Step c, determine, based on position information of a respective second feature point in the second image, second position information of the reference point corresponding to the respective second feature point in a peripheral coordinate system.

Step e, determine, based on the first position information of the N reference points in the display host coordinate system and the second position information of the N reference points in the peripheral coordinate system, a transformation matrix of the display host coordinate system and the peripheral coordinate system.

Step f, acquire first pose data of the peripheral in the peripheral coordinate system.

Step g, determine, based on the first pose data and the transformation matrix, the pose of the peripheral relative to the display host.

In an embodiment, for each group of feature points, within a set range centered on the first feature point in the first image, a gradient change characteristic of a grayscale value of a pixel is a first characteristic, within the set range centered on the second feature point in the second image, a gradient change characteristic of a grayscale value of a pixel is a second characteristic, and the first characteristic is consistent with the second characteristic.

In an embodiment, the above step b includes:
determining, based on the position information of the respective first feature point in the first image, first relative position information between the reference point corresponding to the respective first feature point and the display host;
acquiring third position information of the display host in the display host coordinate system;
determining, based on the first relative position information and the third position information, the first position information of a respective reference point in the display host coordinate system;
the determining, based on the position information of the respective second feature point in the second image, the second position information of the reference point corresponding to the respective second feature point in the peripheral coordinate system includes:
determining, based on the position information of the respective second feature point in the second image, second relative position information between the reference point corresponding to the respective second feature point and the display host;
acquiring fourth position information of the display host in the display host coordinate system;
determining, based on the second relative position information and the fourth position information, the second position information of a respective reference point in the display host coordinate system.

In various embodiments of the present disclosure, the image shot by the device used for projecting structure light images in the display host and peripheral is recorded as the first image, and the image shot by another device is recorded as the second image. For the convenience of description, taking the display host projecting structure light image as an example for explanation and illustration in the following, that is, the image shot by the display host is the first image, and the image shot by the peripheral is the second image.

Figure 4:
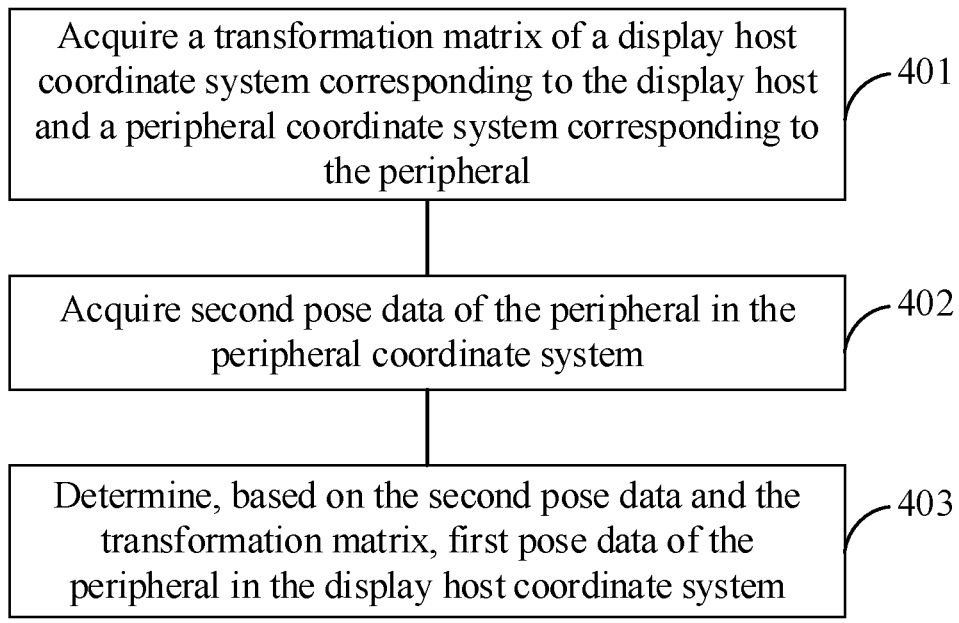
FIG. 4 is a flowchart of another positioning method provided by one or more embodiments of the present disclosure.

FIG. 4 is a flowchart of another positioning method provided by one or more embodiments of the present disclosure. The embodiment may be applied to a case of capturing peripherals of the extended reality devices. The method may be executed by a positioning apparatus, which may be implemented in a form of software and/or hardware, and may be configured in electronic devices, such as the extended reality devices. Specifically, the extended reality devices include a display host and a peripheral. The display host may be a wearable device on a user's body surface, especially a head, and the peripheral may be provided in a form of a handle or gloves.

In the present disclosure, the user refers to the user of the extended reality devices.

As shown in FIG. 4, this method can specifically include the following steps.

Step 401, acquire a transformation matrix of a display host coordinate system corresponding to the display host and a peripheral coordinate system corresponding to the peripheral.

Step 402, acquire second pose data of the peripheral in the peripheral coordinate system.

Step 403, determine, based on the second pose data and the transformation matrix, first pose data of the peripheral in the display host coordinate system.

In an embodiment, the display host coordinate system is created based on environmental data collected by the display host, and the peripheral coordinate system is created based on the environmental data collected by the peripheral.

Furthermore, the display host coordinate system and peripheral coordinate system are both bound to the user's environment. Binding the display host coordinate system to the user's environment refers to a coordinate value of any position in the user's environment under the display host coordinate system is fixed and do not change with the user's movement in the extended real space. When the user wears the display host and moves in the user's environment, the coordinate value of the user in the display host coordinate system changes.

Binding the peripheral coordinate system to the user's environment has the same meaning as binding the display host coordinate system to the user's environment, and will not be repeated here.

In an example, using SLAM (simultaneous localization and mapping) technology to process environmental data collected by the display host and form the display host coordinate system corresponding to the display host. Using SLAM technology to process the environmental data collected by the peripheral and form the corresponding peripheral coordinate system.

The transformation matrix is a bridge that maps any point in the peripheral coordinate system corresponding to the peripheral to the display host coordinate system corresponding to the display host. Since the environment where the display host is located is the same as that of the peripheral, any point in the environment is not only in the peripheral coordinate system corresponding to the peripheral, but also in the display host coordinate system corresponding to the display host, only the specific coordinate values in the two coordinate systems are different. The second pose data of any point in the peripheral coordinate system may be transformed into the pose data of that point in the display host coordinate system through the transformation matrix.

In the above technical solution, by acquiring the transformation matrix of the display host coordinate system corresponding to the display host and the peripheral coordinate system corresponding to the peripheral; acquiring the second pose data of the peripheral in the peripheral coordinate system; and determining, based on the second pose data and the transformation matrix, the first pose data of the peripheral in the display host coordinate system, a new positioning method for the peripheral is proposed. The method uses the transformation matrix to locate an actual position of the peripheral, rather than receiving signals transmitted by a receiving module along a straight line, there is no series of problems, such as "due to a limitation of a field of view, there is a blind spot for tracking, within the blind spot for tracking, it is not possible to locate and track the handle peripherals; if the distance between the display host and the handle peripheral is too far, the signal sent by the transmitting module will be severely attenuated, resulting in a very low signal strength received by the receiving module, making it impossible to locate and track the handle peripheral; if there are objects (obstacles) between the display host and the handle peripheral that prevent the transmission of signals transmitted by the transmission module, it will be impossible to locate and track the handle peripheral", so as to improve an accuracy of positioning.

It should also be noted that if both the display host coordinate system and peripheral coordinate system are bound to the user's environment, which means that after creating the display host coordinate system and the peripheral coordinate system, the transformation matrix of the display host coordinate system and peripheral coordinate system is fixed and does not change with the user's pose. Therefore, it can be set that after the extended reality device is started, the display host coordinate system corresponding to the display host and the peripheral coordinate system corresponding to the peripheral are first created, and then step 401 is executed, and then when tracking the positioning of the peripheral, steps 402 and 403 are repeated until the display host coordinate system corresponding to the display host and/or the peripheral coordinate system corresponding to the peripheral are recreated.

Figure 5:
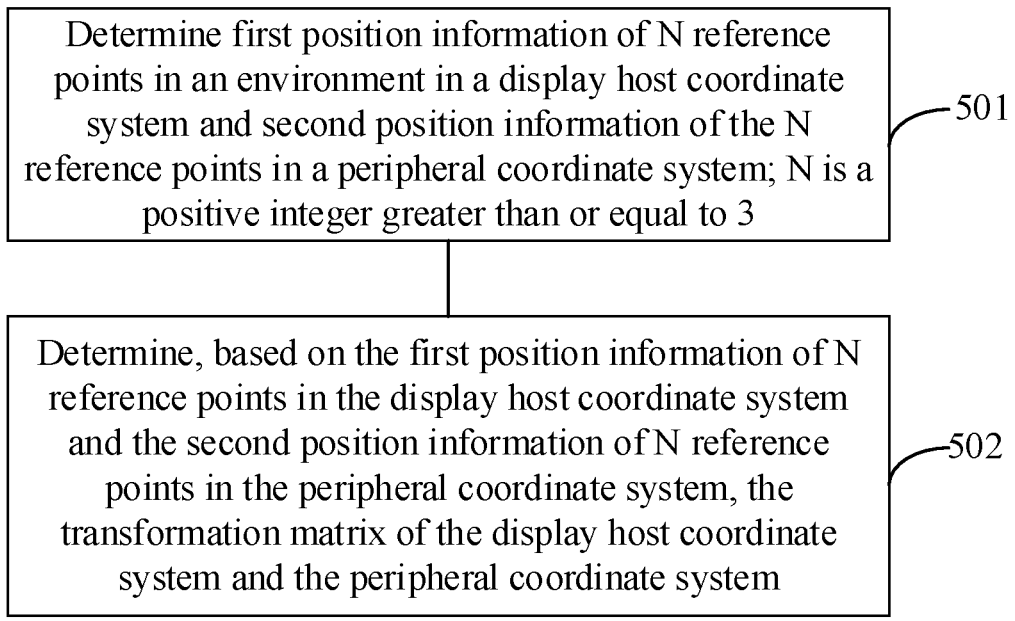
FIG. 5 is a flowchart of a method for implementing step 401 provided by one or more embodiments of the present disclosure.

In practice, there are various methods for implementing step 401, and which is not limited in the present disclosure. Exemplarily, FIG. 5 is a flowchart of a method for implementing step 401 provided by one or more embodiments of the present disclosure. As shown in FIG. 5, this method includes the following steps.

Step 501, determine first position information of N reference points in an environment in a display host coordinate system and second position information of the N reference points in a peripheral coordinate system; N is a positive integer greater than or equal to 3.

The reference points refer to points in a user's environment.

In some examples, in order to improve accuracy of the subsequently obtained transformation matrix, N may be set as a positive integer greater than or equal to 4, and the N reference points are not in a same plane.

Step 502, determine, based on the first position information of N reference points in the display host coordinate system and the second position information of N reference points in the peripheral coordinate system, the transformation matrix of the display host coordinate system and the peripheral coordinate system.

The above technical solution provides a method for determining the transformation matrix of the display host coordinate system and the peripheral coordinate system by using the first position information of N reference points in the display host coordinate system and the second position information of N reference points in the peripheral coordinate system. The calculation of this method is relatively simple and easy to implement. The transformation matrix obtained by this method is in good agreement with an actual situation, and can achieve a goal of subsequent precise positioning of the peripheral.

Figure 6:
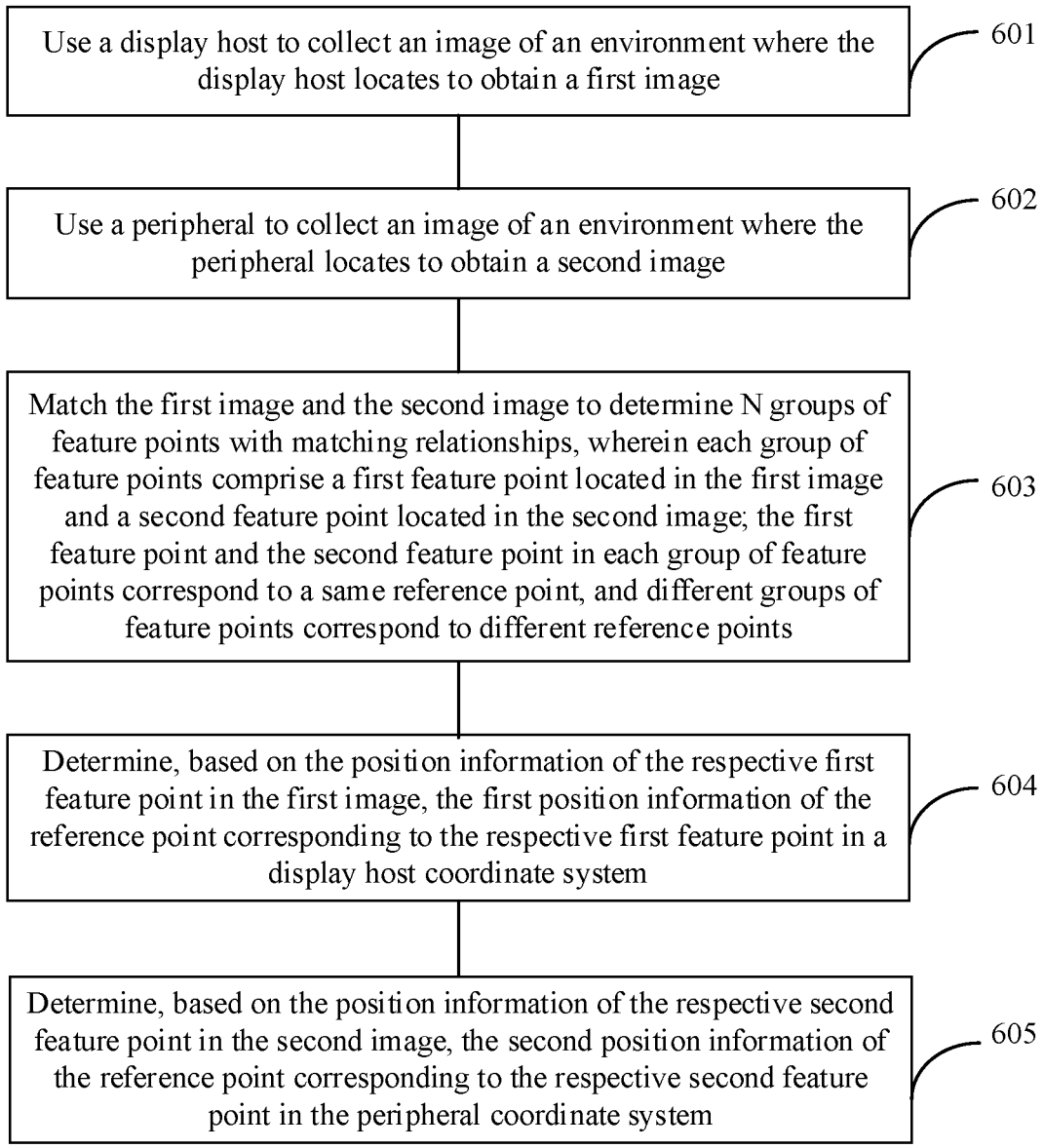
FIG. 6 is a flowchart of a method for implementing step 501 provided by one or more embodiments of the present disclosure.

On the basis of the above technical solution, there are various methods for implementing step 501, and which is not limited in the present disclosure. Exemplarily, FIG. 6 is a flowchart of a method for implementing step 501 provided by one or more embodiments of the present disclosure. Referring to FIG. 6, the method for implementing step 501 includes the following steps.

Step 601, use a display host to collect an image of an environment where the display host locates to obtain a first image.

Step 602, use a peripheral to collect an image of an environment where the peripheral locates to obtain a second image.

Step 603, match the first image and the second image to determine N groups of feature points with matching relationships, where each group of feature points includes a first feature point located in the first image and a second feature point located in the second image; the first feature point and the second feature point in each group of feature points correspond to a same reference point, and different groups of feature points correspond to different reference points.

In one example, when performing this step, which point in the first image and which point in the second image correspond to the same point in the environment (i.e. reference point) may be determined directly based on the first image and the second image, but it is not determined which point in the environment corresponds to the same group of feature points.

Exemplarily, for each group of feature points, within a set range centered on the first feature point in the first image, a gradient change characteristic of a grayscale value of a pixel is a first characteristic, within the set range centered on the second feature point in the second image, a gradient change characteristic of a grayscale value of a pixel is a second characteristic, and the first characteristic is consistent with the second characteristic. Since the first characteristic and the second characteristic are the same, it is considered that the first feature point and the second feature point correspond to the same point in the environment (i.e. the reference point). This manner does not determine which point in the environment corresponds to the same group of feature points.

In an embodiment, the gradient change characteristic of the pixel's grayscale value includes but is not limited to the gradient of the pixel's grayscale value gradually increases, gradually decreases, increases first and then decreases, decreases first and then increases, and there are extreme points, etc.

In another example, when performing this step, which point in the environment is the reference point may be determined first, and then the first feature point corresponding to the reference point in the first image and the second feature point corresponding to the reference point in the second image are determined. In this way, it is necessary to determine which point in the environment corresponds to the same group of feature points.

For example, an infrared signal emitter is installed on the display host and/or the peripheral, which is used to form N light spots in the environment where the infrared signal emitter locates; N light spots are N reference points; the first feature point is the image of the reference point corresponding to the first feature point in the first image; the second feature point is the image of the reference point corresponding to the second feature point in the second image.

Since infrared light spots formed in the environment are obvious, based on this, image matching is performed to determine the first feature point and the second feature point, so that the obtained transformation matrix has a higher accuracy.

Step 604, determine, based on the position information of the respective first feature point in the first image, the first position information of the reference point corresponding to the respective first feature point in a display host coordinate system.

There are multiple implementation methods for this step, and which is not limited in the present disclosure. Exemplarily, the implementation method of this step includes: determining, based on the position information of the respective first feature point in the first image, the first relative position information between the reference point corresponding to the respective first feature point and the display host; acquiring third position information of the display host in the display host coordinate system; determining, based on the first relative position information and the third position information, the first position information of a respective reference point in the display host coordinate system.

Since different positions of points in the environment have different positions in the first image, it is possible to determine the first relative position information between the reference point corresponding to the respective first feature point and the display host based on the position information of the respective first feature point in the first image. Its essence is to use a visual positioning technology to locate the reference point corresponding to the first feature point.

The third position information of the display host in the display host coordinate system may be obtained by processing the data collected by built-in sensors (such as inertial measurement units) of the display host.

Step 605, determine, based on the position information of the respective second feature point in the second image, the second position information of the reference point corresponding to the respective second feature point in the peripheral coordinate system.

There are multiple implementation methods for this step, and which is not limited in the present disclosure. Exemplarily, the implementation method of this step includes: determining, based on the position information of the respective second feature point in the second image, second relative position information between the reference point corresponding to the respective second feature point and the display host; acquiring fourth position information of the display host in the display host coordinate system; determining, based on the second relative position information and the fourth position information, the second position information of a respective reference point in the display host coordinate system.

Since different positions of points in the environment have different positions in the second image, it is possible to determine the second relative position information between the reference point corresponding to the display host second feature point and the display host based on the position information of the display host second feature point in the second image. Its essence is to use a visual positioning technology to locate the reference point corresponding to the second feature point.

The fourth position information of the peripheral in the peripheral coordinate system may be obtained by processing the data collected by built-in sensors (such as inertial measurement units) of the peripheral.

The above technical solution provides a method for determining the first position information of the reference point in the environment in the display host coordinate system and the second position information of the reference point in the peripheral coordinate system. The method is relatively simple and easy to implement, ensuring an accuracy of the transformation matrix obtained in subsequent, and thus determining the subsequent positioning for the peripheral is precision.

In an embodiment, in the above technical solution, the device used in the display host for image collection of its environment may be the camera. The specific installation location of cameras in the display host is not limited in present disclosure. In an example, if the display host is in a form of glasses, the display host is set to include 4 cameras, located at four corners of the glasses lens.

Similarly, the device used in the peripheral for image collection of its environment may be the camera. The specific installation location of cameras in the peripheral is not limited in present disclosure. In an example, if the peripheral is in a form of a handle, the peripheral includes 3 cameras, two of them are set on a front panel of the peripheral, and the remaining one is set on a side adjacent to or opposite to the front panel.

Figure 7:
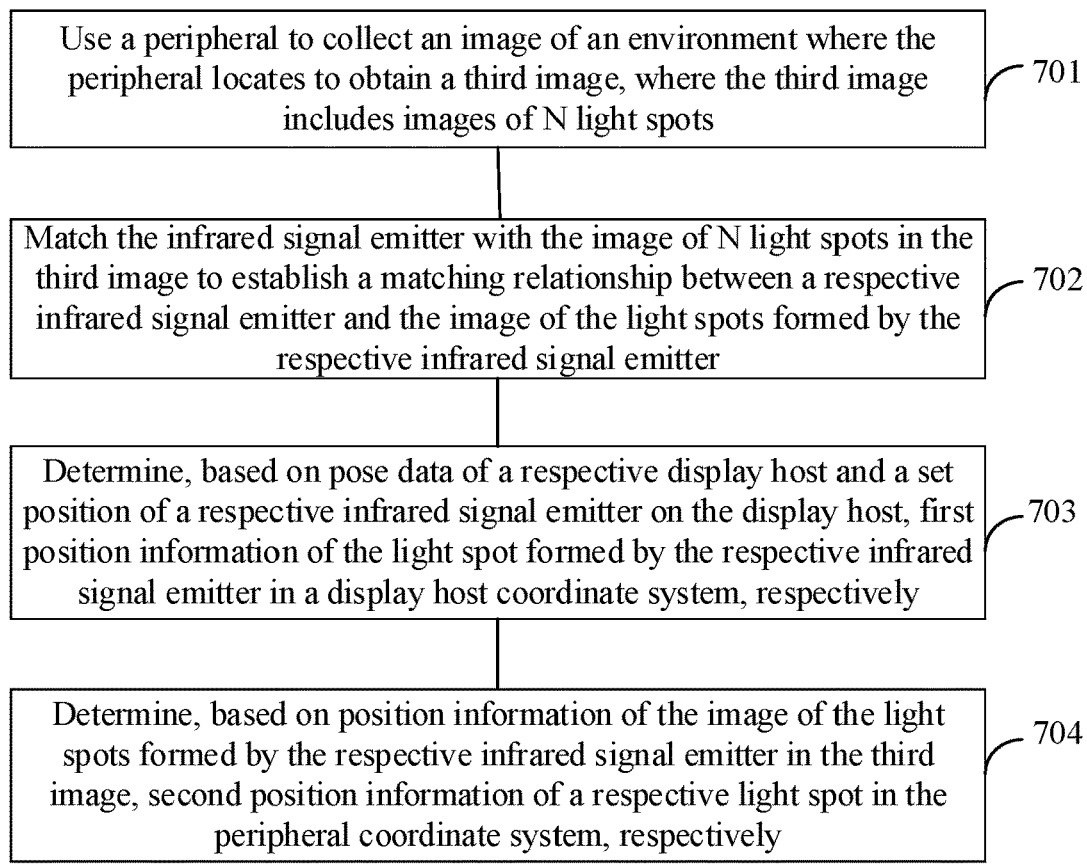
FIG. 7 is a flowchart of another method for implementing step 501 provided by one or more embodiments of the present disclosure.

FIG. 7 is a flowchart of another method for implementing step 501 provided by one or more embodiments of the present disclosure. Refer to FIG. 7, if there are N infrared signal emitters installed on a display host, the infrared signal emitters are used to form N light spots in their environment;

N light spots are N reference points; another method for implementing step 501 includes:

Step 701, use a peripheral to collect an image of an environment where the peripheral locates to obtain a third image, where the third image includes images of N light spots.

Step 702, match the infrared signal emitter with the image of N light spots in the third image to establish a matching relationship between a respective infrared signal emitter and the image of the light spots formed by the respective infrared signal emitter.

There are various implementation manners for this step, and which is not limited in the present disclosure. For example, multiple infrared signal emitters are controlled to emit infrared signals in turn, and at any time, only one infrared signal emitter is allowed to emit infrared signals, and an image collecting module is indicated to collect images of the formed light spots. In this way, a purpose of matching the infrared signal emitter with the spot images in the third image may be achieved.

Alternatively, a brute force matching algorithm may be used to match the infrared signal emitter with the spot images in the third image.

Alternatively, it is possible to set to determine, based on relative positions of all spot images in the third image, geometric features of shapes presented by all spot images; to obtain, based on a setting position of the infrared signal emitter on the display host, the geometric features of the shapes presented by the light spots formed by different combinations of infrared signal emitters; to determine the matching relationship between the light spot images in the third image and the infrared signal emitter by comparing the geometric features of the light spot in the third image with the geometric features of the light spot formed by the infrared signal emitter.

Step 703, determine, based on pose data of a respective display host and a set position of a respective infrared signal emitter on the display host, first position information of the light spot formed by the respective infrared signal emitter in a display host coordinate system, respectively.

Since the infrared signal emitter is fixed on the display host, the relative position relationship between the respective infrared signal emitter and the display host is fixed, the display host may obtain its position information in the display host coordinate system based on its own sensors. By combining the relative position relationship between the respective infrared signal emitter and the display host, as well as the position information of the display host in the display host coordinate system, the position information of the respective infrared signal emitter in the display host coordinate system may be obtained. The first position information of the light spot (i.e. reference point) formed by the respective infrared signal emitter in the display host coordinate system may be obtained based on the position information of the respective infrared signal emitter in the display host coordinate system.

Step 704, determine, based on position information of the image of the light spots formed by the respective infrared signal emitter in the third image, second position information of a respective light spot in the peripheral coordinate system, respectively.

The essence of this step is to use a visual positioning technology to locate the reference point (i.e. light spot) to determine the second position information of the reference point in the peripheral coordinate system.

The above technical solution provides another method to determine the first position information of the reference point in the environment in the display host coordinate system and the second position information of the reference point in the peripheral coordinate system. The method is relatively simple and easy to implement, ensuring an accuracy of the transformation matrix obtained in subsequent, and thus determining the subsequent positioning for the peripheral is precision.

In an embodiment, if there are N infrared signal emitters installed on the peripheral, the infrared signal emitter is used to form N light spots in its environment; N light spots are N reference points; the specific implementation method of step 411 includes: using a display host to collect an image of an environment where the display host locates to obtain a fourth image, where the fourth image includes images of N light spots; matching the infrared signal emitter with the image of N light spots in the fourth image to establish a matching relationship between a respective infrared signal emitter and the images of the light spots formed by the respective infrared signal emitter; determining, based on position information of the images of the light spots formed by the respective infrared signal emitter in the fourth image, first position information of a respective light spot in the display host coordinate system, respectively; and determining, based on pose data of a respective peripheral and a setting position of a respective infrared signal emitter on the peripheral, the second position information of the light spot formed by the respective infrared signal emitter in the peripheral coordinate system, respectively.

Figure 8:
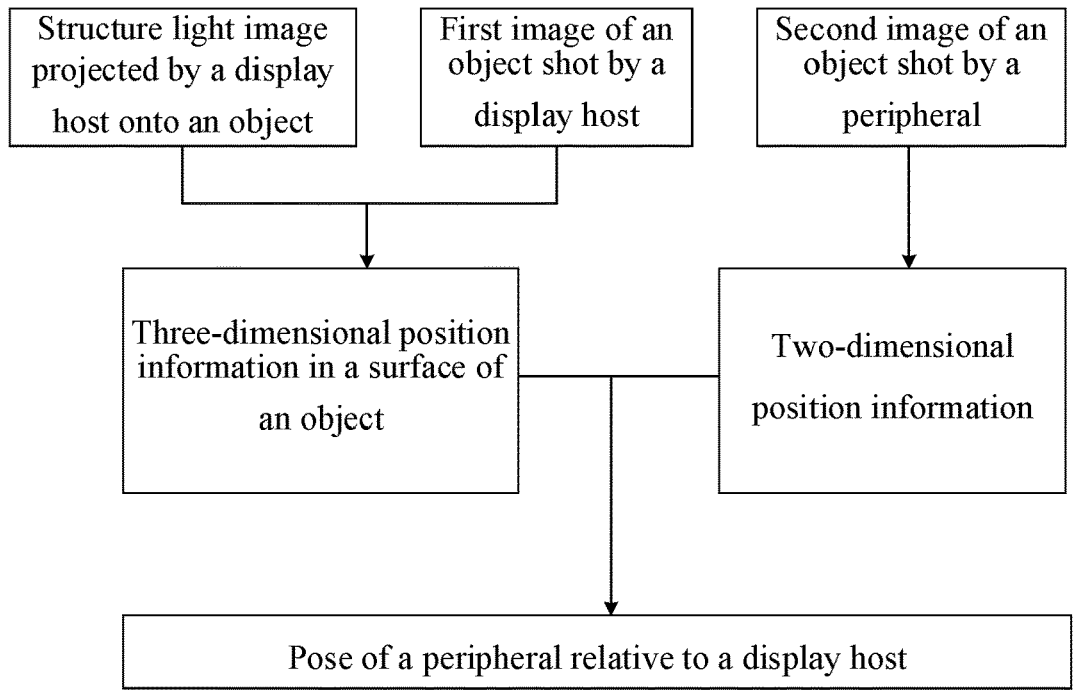
FIG. 8 is a schematic diagram of a principle for determining a pose provided by one or more embodiments of the present disclosure.

FIG. 8 is a schematic diagram of a principle for determining a pose provided by one or more embodiments of the present disclosure. As shown in FIG. 8, the determining, according to image obtained by shooting, the pose of the peripheral relative to the display host may include steps h to j as follows.

Step h, determine, according to the structure light image and a first image, three-dimensional position information of multiple spatial positions corresponding to the multiple light patterns in the structure light image projected onto a surface of an object.

In an embodiment, the structure light image includes multiple light patterns. The light pattern may be any type of pattern, including but not limited to: points, crosses, lines, angles, rings, etc., as long as it can play a role in identifying the position in a space.

After the projection apparatus projects the light pattern onto an object, an illumination position formed on the surface of the object may be recorded as the spatial position corresponding to the light pattern, that is, the position where a projected beam intersects with the surface of the object. The spatial position may be points, lines, planes, surfaces, etc., and the three-dimensional position information of the spatial position may be a coordinate, a straight line equation, a curve equation, etc. of the spatial position.

In an example, the light pattern is a point, and after being projected onto the object, light points will be formed on the surface of the object, the light points are the spatial positions corresponding to the light pattern. The light points are spatial points located on the surface of the object, and their corresponding three-dimensional position information is the three-dimensional coordinates of the spatial point.

In another example, the light pattern is a straight line, and after being projected onto the object, one or more bright lines or curves will be formed on the surface of the object usually, the bright lines or the curves are the spatial positions corresponding to the light pattern, and their corresponding three-dimensional position information may be a spatial straight line equation or curve equation.

In another example, the light pattern can be a speckle, and after being projected onto an object, the illumination position on the surface of the object may be an area, which may be the spatial position corresponding to the light pattern, and the area may be a plane or a non-plane with a certain depth change. Depth information of multiple points in the area may be determined through the speckle, the three-dimensional position information corresponding to the area may be the coordinates of a center position of the area or an average value of the coordinates of multiple points.

The three-dimensional position information of the spatial position of the surface of the object may be determined by performing a three-dimensional reconstruction on the object according to the structure light image and the first image.

Specifically, the position of the light pattern in the structure light image may be determined according to the structure light image. The projection position of the spatial position corresponding to the light pattern in the first image may be determined according to the first image. The three-dimensional coordinates of the spatial position may be determined according to the position of the light pattern in the structure light image, the projection position of the light pattern in the first image, and a relative position relationship between the projection apparatus and the camera in the display host.

Step i, determine two-dimensional position information of at least part of spatial position of the multiple spatial positions in a second image.

According to the second image, the projection position of the at least part of spatial position in the second image may be extracted, the projection position has the two-dimensional position information, such as the two-dimensional coordinate corresponding to the point or the plane straight line equation corresponding to the line.

The at least part of spatial position may be part of spatial position of the multiple spatial positions, or may be all spatial positions.

Taking spatial points as an example, due to possible differences in the shooting range between the display host camera and the peripheral camera, the number of spatial points shot by the display host camera and shot by the peripheral camera may not be consistent. Among the multiple spatial points determined by the first image shot by the display host camera, the camera may only shoot part of them. Additionally, when the surface of the object fluctuates excessively, it is also possible to block a part of spatial points, resulting in the number of spatial points shot by the display host camera and shot by the peripheral camera are not consistent, but these situations usually do not affect a solution of the pose.

Step j, determine, according to the three-dimensional position information of the multiple spatial positions and the two-dimensional position information corresponding to the at least part of spatial position, the pose of the peripheral relative to the display host.

When the spatial position is the spatial point, the three-dimensional coordinates of N spatial points (3D points) may be determined according to the first image shot by the display host camera. The two-dimensional coordinates of the 2D points projected on the second image by M spatial points may be determined according to the second image shot by the peripheral camera, where M is less than or equal to N.

By using the three-dimensional coordinates of N 3D points and the two-dimensional coordinates of M 2D points, a matching relationship between 2D points and 3D points may be determined. That is, each 2D point is a specific projection of which 3D point. The pose of the peripheral may be determined according to the coordinates of the 2D points and 3D points with the matching relationship and internal parameters of the peripheral camera.

In a case where a positional relationship between 3D and 2D points is complex, it may be difficult to directly and accurately determine the matching relationship. At this time, the matching relationships between 3D and 2D points may be exhausted, and the corresponding pose is solved through algorithms under each matching relationship. Because there may be $N!/(N-M)!$ matching relationships, it can be considered that a computational complexity of this solution is $N/(N-M)!$.

For each matching relationship, if the matching relationship is incorrect, a result may not be solved through the algorithm, or, after the result is solved, a corresponding error of the result is relatively large. The results corresponding to each matching relationship may be compared and the result with the smallest error may be chosen from them.

In an embodiment, prior information of the pose may be added for processing. Specifically, in a practical application, although there is a change in pose between adjacent two moments, the change is usually not significant or is predictable. Therefore, the position of points in the image at adjacent two moments does not change much. For any point in the image, the position range of the point at the next moment may be predicted, generally near the position of the previous moment. When determining the matching relationship between N 3D points and M 2D points, the prior information may be utilized. For example, the 3D points are matched together preferentially with the 2D points within a predicted range, the obtained matching relationship has a higher probability of approaching a true matching relationship compared to a random matching. When an error of the pose solved according to the matching relationship meets certain conditions, the pose may be used as a final result without the need to try other matching relationships. Therefore, adding prior information can effectively reduce the number of matching, without the need to traverse all matching relationships, and improve a matching efficiency.

In summary, the embodiment utilizes the principle of three-dimensional reconstruction to extract the three-dimensional position information of spatial positions from the first image shot by the display host, and extract corresponding two-dimensional position information from the second image shot by the peripheral. The pose of the peripheral is determined according to the extracted three-dimensional position information and two-dimensional position information. Only position information such as the coordinates of spatial points is needed to solve the pose, without the need to process other information such as texture information around spatial points in the image, it can effectively reduce the workload, simplify a solving process, and improve an accuracy of position.

The method described in the foregoing requires solving the pose according to the coordinates of 3D points and 2D points without knowing the matching relationship, which has a high complexity. Therefore, using this method generally requires a smaller M and N to reduce the time required for blind matching between 3D and 2D points, or to assume that the predicted pose is very close to the pose to be solved, which has certain limitations in a practical application.

In view of this, an embodiment of the present disclosure also provides a scheme for solving the pose based on a deep learning. In an embodiment, the three-dimensional position information of the multiple spatial positions and the two-dimensional position information corresponding to at least part of spatial positions are input into a pose positioning model to obtain the pose of the peripheral relative to the display host.

In one example, the light pattern is a point, and the three-dimensional coordinates of M 3D points and the two-dimensional coordinates of N 2D points may be spliced and input into the pose positioning model to obtain the pose of the peripheral. The pose positioning model may be a deep learning model achieved based on a neural network.

In another example, the light pattern is a straight line segment, the projection position of the straight line segment on the object surface and the projection position in the image shot by the peripheral may be input into the pose positioning model to obtain the pose of the peripheral.

The pose positioning model may be a model achieved based on the neural network, the specific network structure of the pose positioning model is not limited in the embodiment, as long as the pose prediction function can be achieved.

In summary, through a deep learning method, the pose may be determined through the neural network model based on both the three-dimensional position information and two-dimensional position information, without the need to solve the specific matching relationship between the three-dimensional position information and the two-dimensional position information, a final pose may be directly obtained, solving a problem of blind matching between large-scale 3D and 2D points, and further improving an effect and accuracy of determining the pose.

In one or more embodiments of the present disclosure, the corresponding pose positioning model may be obtained by training the neural network model through the training data.

The training data includes the pose, the three-dimensional position information of multiple spatial positions, and the two-dimensional position information of at least part spatial positions in this pose. During a training process, the three-dimensional position information and the two-dimensional position information in the training data may be input into the model to obtain the predicted pose. The predicted pose may be compared with the pose in the training data, and model parameters may be adjusted according to a comparison result, so that the pose output by the model is as close to a real pose as possible.

The training data may usually be generated based on actual shooting. In an embodiment, the structure light image may be projected onto the object through the projection apparatus of the display host. In a specific pose, images are obtained by the display host camera and the peripheral camera shooting the object respectively, the shot images are processed to obtain the three-dimensional position information and the two-dimensional position information of multiple spatial positions, and corresponding training data is generated.

Although the above methods may construct the training data, there is a significant workload problem in an actual shooting. In view of this, an embodiment of the present disclosure provides a method for model training, including:
randomly generating multiple depths, simulating virtual objects formed by projecting the structure light image onto the multiple depths to obtain the three-dimensional position information corresponding to the multiple spatial positions; simulating the peripheral to shoot the at least part of spatial position of the multiple spatial positions in at least one pose to obtain the two-dimensional position information of the at least part of spatial position in an image shot by the peripheral; generating corresponding training data for respective pose; training, based on the generated training data, a neural network model to obtain the pose positioning model.

Specifically, multiple depths may be randomly generated, the multiple depths may be depths relative to the projection apparatus, the projection apparatus projects the structure light image onto the virtual object may be simulated, and a surface of the virtual object may present the multiple depths. In a case of the projection direction and depth are known, the three-dimensional position information of the spatial position with the depth along the projection direction may be determined. In a specific pose, simulating the peripheral to shoot spatial positions of multiple depths the corresponding two-dimensional position information of the spatial position in the image shot by the peripheral may be calculated, the two-dimensional position information obtained under different poses may be different. For each specific pose, corresponding training data may be generated, which includes the determined three-dimensional position information and two-dimensional position information, and its corresponding label is the specific pose.

The depth may be randomly generated multiple times and the pose may be adjusted multiple times to determine the corresponding three-dimensional position information and two-dimensional position information at different depths and different poses, thereby multiple groups of training data are obtained, and the model may be trained through multiple groups of training data.

In the embodiment, by simulating possible depths and possible observation situations, the three-dimensional position information and the two-dimensional position information are calculated, and the neural network model is trained without the need for actual projection of the structure light image and shooting, which can effectively reduce the workload and improve an efficiency of model training, and the generated three-dimensional position information and two-dimensional position information are calculated based on the determined depth and pose, which has a high accuracy.

In other implementations, the image may also be directly input into the pose positioning model. For example, the first image, the second image, and the structure light image may be input into the pose positioning model to obtain the pose of the peripheral. The training data may be constructed through corresponding images.

In one or more embodiments of the present disclosure, the determining, according to the three-dimensional position information of the multiple spatial positions and the two-dimensional position information corresponding to the at least part of spatial position, the pose of the peripheral relative to the display host, may include: solving, according to the two-dimensional position information corresponding to the at least part of spatial position and the three-dimensional position information of the multiple spatial positions, a transformation equation to obtain the pose of the peripheral relative to the display host;
the three-dimensional position information of the multiple spatial positions is three-dimensional position information of the multiple spatial positions in a display host coordinate system; the transformation equation is used to represent a relationship between the three-dimensional position information of the multiple spatial positions in a peripheral coordinate system and corresponding two-dimensional position information; the three-dimensional position information of the multiple spatial positions in the peripheral coordinate system is determined by the three-dimensional position information of the multiple spatial positions in the display host coordinate system and the pose of the peripheral relative to the display host.

Figure 9:
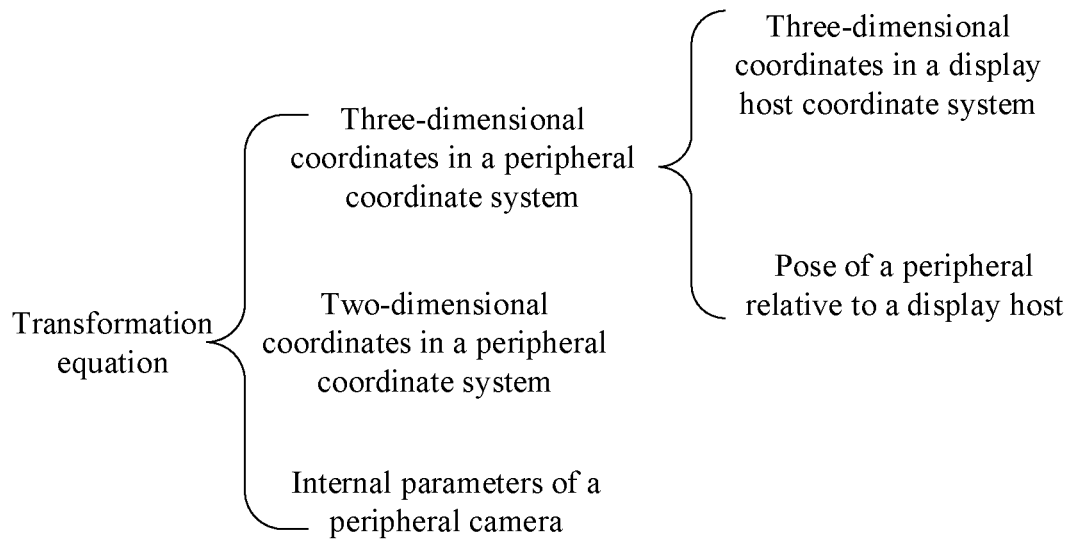
FIG. 9 is a schematic diagram of a construction of a conversion equation provided by one or more embodiments of the present disclosure.

FIG. 9 is a schematic diagram of a construction of a conversion equation provided by one or more embodiments of the present disclosure. As shown in FIG. 9, taking a spatial position as a spatial point as an example, a transformation equation is used to represent a relationship between three-dimensional coordinates of the spatial point in a peripheral coordinate system and two-dimensional coordinates in the peripheral coordinate system. The two-dimensional coordinates in the peripheral coordinate system refer to the two-dimensional coordinates projected by the spatial point onto an image shot by the peripheral, the relationship between the three-dimensional coordinates and the two-dimensional coordinates may be determined through internal parameters of the peripheral camera. The three-dimensional coordinates in the peripheral coordinate system cannot be directly detected, but there is a certain relationship between the three-dimensional coordinates in the peripheral coordinate system and the three-dimensional coordinates in the display host coordinate system, which is determined by the pose of the peripheral relative to the display host.

Therefore, the transformation equation may be constructed by the three-dimensional coordinates in the display host coordinate system, the two-dimensional coordinates in the peripheral coordinate system, the internal parameters of the camera, and the pose. The internal parameters of the camera are determined, the three-dimensional coordinates and two-dimensional coordinates may be calculated based on the image. Therefore, the corresponding pose may be obtained by solving the transformation equation.

When a light pattern is a point, the number of points is generally large, and determining a matching relationship between the three-dimensional coordinates and the two-dimensional coordinates may take a lot of time. In the embodiment, the pose may be determined by using a combination of straight line segments and transformation equations.

Specifically, the projected light pattern may include a line segment, with no limitations on the direction, and may be a horizontal line segment, or a vertical line segment, or an oblique line segment. Since fluctuations of a surface of an object are different, the projection of the line segment on the surface of the object may be a straight line or a non-straight line. The corresponding spatial position may be a line or some points on the line, for example, it can include at least one of the following: the line (a straight line or a non-straight line), an endpoint of the line, an inflection point in the non-straight line.

Figure 10:
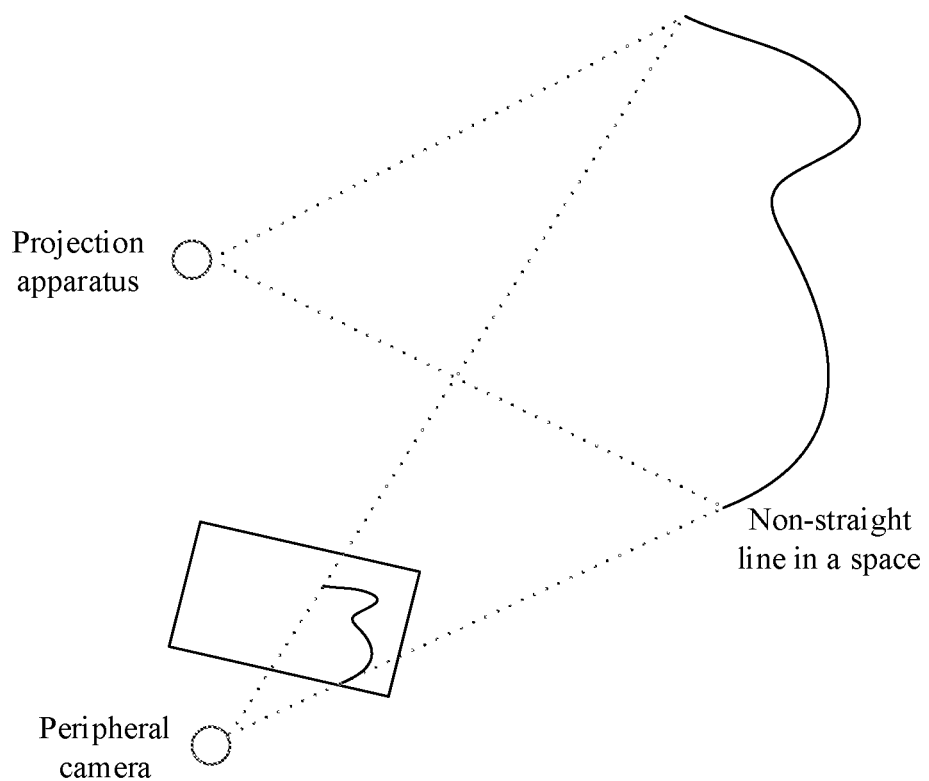
FIG. 10 is a schematic diagram of a line segment projected as a non-straight line provided by one or more embodiments of the present disclosure.

FIG. 10 is a schematic diagram of a line segment projected as a non-straight line provided by one or more embodiments of the present disclosure. As shown in FIG. 10, when the surface of the object fluctuates significantly, the projection apparatus projects the line segments in the structure light image onto the object, non-straight lines will be formed in a space, the non-straight lines may be curves, polylines, etc. The images shot by a peripheral camera usually are non-straight lines.

In an embodiment, if the projection corresponding to at least one line segment in the second image is a non-straight line, a coordinate conversion equation is solved according to coordinates of multiple points in the non-straight line, to determine the pose of the peripheral relative to the display host, where the multiple points include inflection points and/or endpoints of the non-straight line.

Whether the projected line is the straight line may be determined in various manners. In an embodiment, a fitted line may be obtained by fitting based on the points on the line, and then a residual between the fitted line and the line is calculated. If the residual is less than a certain threshold, the line is considered as belong to the straight line, otherwise, the line is considered as belong to a non-straight line.

In a case of the line belongs to the non-straight line, the multiple spatial positions may refer to the points in the non-straight line formed after the line is projected onto the surface of the object, which may be endpoints or inflection points. For the same non-linear line, the fluctuation situation in a first image shot by a display host camera and a second image shot by the peripheral camera are relatively similar. Therefore, the matching relationship may be determined directly through the endpoint and the inflection point determined by the first image and the second image. After the matching relationship is determined, according to the two-dimensional coordinates of the points in the first image, the three-dimensional coordinates of the corresponding spatial points may be determined, and the transformation equation may be solved by combining the two-dimensional coordinates of the points in the second image to obtain the pose.

The transformation equation corresponding to points on the non-straight line may include the following formulas (1) and (2).

$$\begin{bmatrix} x' \\ y' \\ z' \end{bmatrix} = R \begin{bmatrix} x \\ y \\ z \end{bmatrix} + t \quad (1)$$

$$z' K^{-1} \begin{bmatrix} u \\ v \\ 1 \end{bmatrix} = \begin{bmatrix} x' \\ y' \\ z' \end{bmatrix} \quad (2)$$

where x, y, and z are the three-dimensional coordinates of the spatial point in the display host coordinate system, x', y', and z' are the three-dimensional coordinates of the spatial point in a peripheral coordinate system. The conversion relationship between the two is determined by the pose Rt, where R is a rotation matrix and t is a translation vector. u, v is the two-dimensional coordinate corresponding to the spatial point in the second image, and K is the internal parameter of the peripheral camera.

In a practical application, it can be assumed that the inflection points (or endpoints) in the first image and the corresponding inflection points (or endpoints) in the second image have a matching relationship (that is, they correspond to the same spatial point), according to these inflection points (or endpoints) with the matching relationship, the above equation may be solved to obtain the pose.

In an embodiment, a predicted projection position of the line segment in the second image may be calculated according to the pose obtained by the solution; an error corresponding to the solved pose is determined according to the predicted projection position and an actual projection position of the non-linear line; the pose is updated by using a gradient descent method according to the error, until the updated pose meets a preset requirement.

Specifically, after an initial pose is obtained, the projection position of the non-straight line in the space in the image shot by the peripheral at the pose is predicted, and the predicted projection position is compared with the actual projection position (i.e. the non-straight line extracted from the second image). The difference between the two may reflect the error corresponding to the calculated pose. When the error is large, the pose may be iteratively updated, until the error of the pose after updated is less than a certain threshold or the number of iterations meets a requirement. Through the method, the initial pose may be solved first according to an initial matching relationship, and then the pose is optimized according to the predicted projection position and the actual projection position, the efficiency and accuracy are balanced.

Figure 11:
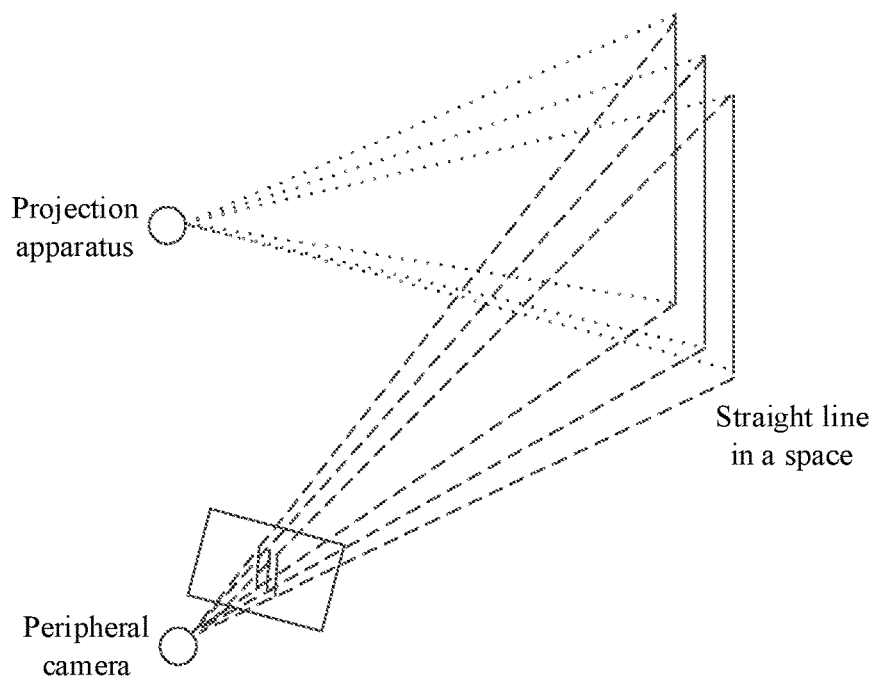
FIG. 11 is a schematic diagram of a line segment projected as a straight line provided by one or more embodiments of the present disclosure.

FIG. 11 is a schematic diagram of a line segment projected as a straight line provided by one or more embodiments of the present disclosure. As shown in FIG. 11, when a surface of an object is relatively flat, there is no bending change when a projection apparatus projects a straight line segment onto the object, a straight line is formed in a space, and a corresponding projection in the image shot by a peripheral camera is also the straight line.

In an embodiment, if projections corresponding to at least three line segments in the second image are all straight lines, solving, according to a spatial straight line equation corresponding to the at least three line segments and a plane straight line equation corresponding to the at least three line segments in the second image, a line conversion equation to determine the pose of the peripheral relative to the display host.

In this situation, the aforementioned spatial position may specifically refer to the straight line formed after the straight line segment is projected onto the surface of the object, and its projection in the image shot by the peripheral is also the straight line. The position of the peripheral may be solved according to the spatial straight line equation corresponding to the straight line and the plane straight line equation of the straight line in the image.

In an embodiment, the plane straight line equation may be represented as:

$$u = mv + n \quad (3)$$

where u and v represent horizontal and vertical coordinates of any point on the line, and m and n represent the coefficients of the plane straight line equation. m and n may be determined according to the coordinates of two points on the straight line.

Under the display host coordinate system, the spatial straight line equation may be expressed as:

$$\begin{bmatrix} x_i \\ y_i \\ z_i \end{bmatrix} = \begin{bmatrix} x_0 \\ y_0 \\ z_0 \end{bmatrix} + \mu \begin{bmatrix} l_0 \\ l_1 \\ l_2 \end{bmatrix} \quad (4)$$

where $(x_i, y_i, z_i)$ is the coordinate of any point on the line, and the space straight line equation is specifically the line equation passing through the point $(x_0, y_0, z_0)$, with $[l_0, l_1, l_2]$ as a direction vector, $\mu$ is a coefficient. $(x_0, y_0, z_0)$ and $[l_0, l_1, l_2]$ may be determined according to the coordinates of multiple points in the line.

The internal parameters of the peripheral camera may be expressed as:

$$K = \begin{bmatrix} f & 0 & u_0 \\ 0 & f & v_0 \\ 0 & 0 & 1 \end{bmatrix} \quad (5)$$

where f is a focal length of the camera, and $u_0$ and $v_0$ are main point coordinates.

According to the above formulas, the following equation may be constructed to solve the pose Rt.

$$\begin{cases} \begin{bmatrix} x' \\ y' \\ z' \end{bmatrix} = R \begin{bmatrix} x_0 \\ y_0 \\ z_0 \end{bmatrix} + t \\ \begin{bmatrix} l'_0 \\ l'_1 \\ l'_2 \end{bmatrix} = R \begin{bmatrix} l_0 \\ l_1 \\ l_2 \end{bmatrix} \\ x' - my' = \frac{mv_0 + n - u_0}{f} z' \\ l'_0 - ml'_1 = \frac{mv_0 + n - u_0}{f} l'_2 \end{cases} \quad (6)$$

where (x', y', z') and $[l_0', l_1', l_2']$ are the coefficients obtained by converting $(x_0, y_0, z_0)$ and $[l_0, l_1, l_2]$ into the peripheral coordinate system, which is equivalent to obtaining the spatial straight line equation of the straight line in the peripheral coordinate system, and then the relationship between the spatial straight line equation and the plane straight line equation in the peripheral coordinate system may be determined by combining the internal parameters of the peripheral camera.

In the above solutions, there are multiple projected line segments, and multiple lines shot by the display host and the peripheral, and here are various implementations to determine a matching relationship of the lines. For example, the projected multiple line segments are parallel, and the relative position relationship of the shot multiple lines will not change substantially, so the matching relationship may be directly determined. Alternatively, some matching relationships may be tried and if they are not suitable, it may be adjusted. In addition, in a situation where a real-time requirement is not high, an accuracy may be further improved by projecting a structure light containing temporal information, such as the structure light after encoded.

After the matching relationship is determined, an equation containing Rt may be constructed using formula (6). In an embodiment, Rt may contain 6 parameters specifically, and corresponding to 6 degrees of freedom. When the line equations of three straight line segments are determined, the 6 parameters in Rt may be solved. When the line equations of more line segments are determined, a least squares method may be used to solve the Rt with the smallest error.

In summary, when the projected light pattern is the straight line segment, a transformation equation may be used to solve the pose. Since the matching relationship of the lines is easier to determine compared to scattered points, processing the lines through the transformation equation can quickly and accurately determine the peripheral pose, improving a processing efficiency. In addition, it can also be solved by different formulas depending on whether the projected line is the straight line or the non-straight line. For the straight line, the line transformation equation corresponding to multiple straight lines may be used to solve directly, for the non-straight line, information of the endpoints and inflection points therein can be may be used to solve through the coordinate transformation equations of the points, so as to solve the pose for different situations more efficiently.

In one or more embodiments of the present disclosure, the display host or the peripheral may be equipped with one or more projection apparatuses. When there are multiple projection apparatuses, different projection apparatuses may have different projection angle ranges.

Figure 12:
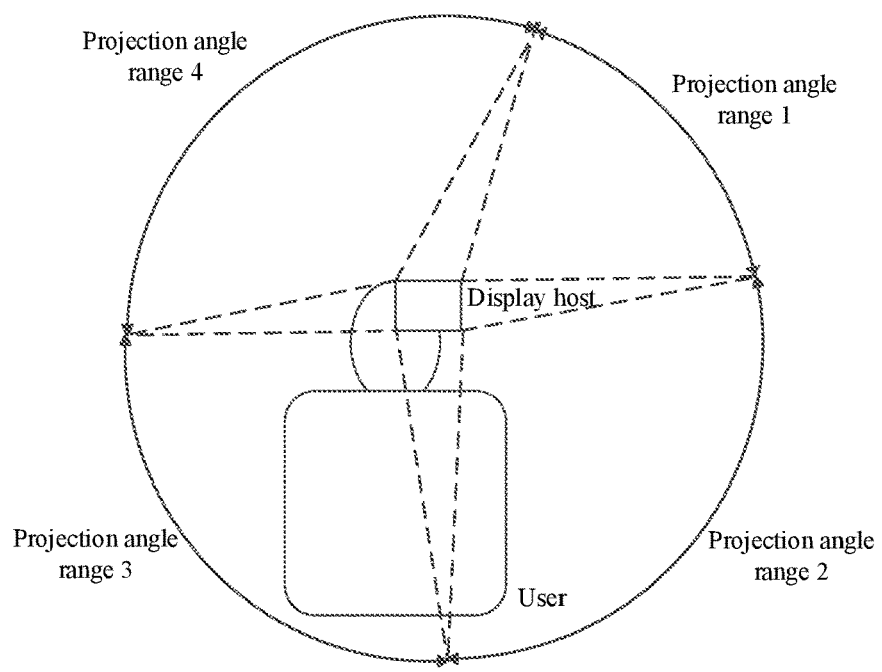
FIG. 12 is a schematic diagram of a projection angle provided by one or more embodiments of the present disclosure.

FIG. 12 is a schematic diagram of a projection angle provided by one or more embodiments of the present disclosure. As shown in FIG. 12, there are 4 projection apparatuses installed on the display host worn by a user, corresponding to a projection angle range 1, projection angle range 2, projection angle range 3, and projection angle range 4, so as to cover various angles as much as possible and improve the range of the peripheral that may be located.

In an embodiment, after determining the pose of the peripheral relative to the display host, the pose of the peripheral relative to the display host at a next moment may be predicted according to a historical pose of the peripheral relative to the display host and the pose determined at a current moment, a shooting range of the peripheral at the next moment is determined according to a predicted pose.

For example, through a trajectory prediction algorithm, the pose at the next moment may be predicted according to the pose of the peripheral at the latest n moments. The shooting range of the peripheral at the next moment may be predicted according to the pose.

After determining the shooting range of the peripheral, a structural light beam projected at the next moment may be adjusted to ensure that the projected structural light beam may be shot by the peripheral as much as possible after shining on the object.

In an implementation solution, a structure light image for the next moment may be generated according to the predicted shooting range at the next moment, so that multiple light patterns in the structure light image projected onto the object as much as possible within the shooting range of the peripheral.

For example, when the shooting range of the peripheral is moved to the left, the positions of multiple light patterns in the structure light may also be moved to the left. In areas that cannot be shot by the peripheral, corresponding light patterns may be reduced or not set.

In an embodiment, multiple light patterns may be pre-set, and in a practical application, which light patterns may be dynamically adjusted and lit according to the shooting range. Exemplarily, m horizontal lines and k vertical lines are pre-set to generate m×k cross points serve as light patterns. After predicting the shooting range of the peripheral at the next moment, only part of the cross points may be illuminated in the structure light image at the next moment. A pose estimation is performed according to the cross points observed through the peripheral camera.

This implementation only requires modifying the structure light image, which has low hardware functional requirements and is easy to implement and promote.

In another implementation solution, the projection angle of the projection apparatus at the next moment may be adjusted according to the predicted shooting range at the next moment.

In an embodiment, the projection angle of the projection apparatus is adjustable. After determining the shooting range at the next moment, the projection apparatus may be driven to rotate to the corresponding projection angle, so that the peripheral may shoot the projected light pattern as much as possible.

This implementation method does not require modifying the structure light image and has a relatively low requirement for the number of projection apparatuses. By using one or fewer projection apparatuses, dynamic adjustment of the projection range may be achieved.

In another implementation solution, if multiple projection apparatuses with different projection ranges set on the display host or the peripheral, determining, according to the shooting range, a projection apparatus to be enabled at the next moment.

In an embodiment, the projection range of the multiple projection apparatuses may be fixed or adjustable. The projection range of different projection apparatuses may be different, and only the projection apparatuses corresponding to the projection range that matches the shooting range at the next moment can be enabled.

This manner does not require the projection apparatus to be adjustable in projection angle, and can enable some projection apparatuses according to the shooting range at the next moment. Other projection apparatuses may not be enabled, so as to reduce an energy consumption.

In summary, by predicting the pose of the next moment based on the historical pose, and determining the shooting range of the next moment according to the prediction results, determining how to project the structure light image according to the shooting range, so that the projected beam can shine on the shooting range of the peripheral as much as possible, the projection accuracy is improved, unnecessary resource waste is reduced, and the spatial points shot by the display host within the non-peripheral shooting range is reduced, thereby reducing the workload of solving pose and improving overall efficiency.

In the technical solutions provided in the above embodiments, the structure light image may be projected by the display host, the peripheral, or by two devices simultaneously. The process of solving the pose may be performed by one device or completed by two devices. For example, after two devices extract position information from the image respectively, the extracted position information is summarized into one device for pose solving.

Figure 13:
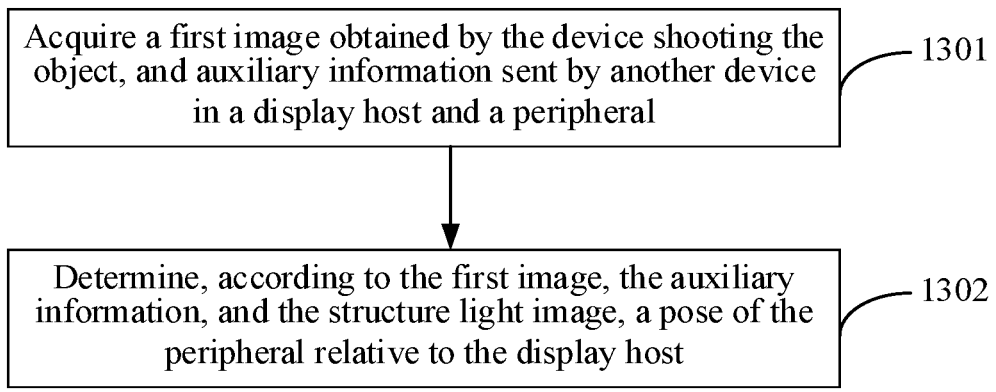
FIG. 13 is a flowchart of another positioning method provided by one or more embodiments of the present disclosure.

FIG. 13 is a flowchart of another positioning method provided by one or more embodiments of the present disclosure. The method is applied to any device in a display host and a peripheral, the device is used for projecting a structure light image onto an object in a real environment. As shown in FIG. 13, the method may include the following steps.

Step 1301, acquire a first image obtained by the device shooting the object, and auxiliary information sent by another device in the display host and the peripheral.

The auxiliary information includes: a second image obtained by another device shooting the object, or two-dimensional position information of at least part of spatial position of multiple spatial positions in the second image.

In the display host and the peripheral, the device used for projecting the structure light image may be labeled as a main device, and another device may be labeled as a secondary device. In the embodiment, an algorithm for solving a pose may be executed by the main device. The secondary device may directly send the shot second image to the main device, or it may extract the information needed to solve the pose from the second image and send it to the main device, such as two-dimensional position information, so as to save the workload of data transmission and improve a processing efficiency.

Step 1302, determine, according to the first image, the auxiliary information, and the structure light image, a pose of the peripheral relative to the display host.

The multiple spatial positions are multiple spatial positions correspond to multiple light patterns in the structure light image projected onto a surface of the object.

In an embodiment, after the main device obtains the second image or two-dimensional position information extracted from the second image, the pose of the peripheral may be solved by referring to the method of any of the aforementioned embodiments.

The specific implementation process, principles, and beneficial effects of the positioning method provided in the embodiment may refer to the aforementioned embodiments, and will not be repeated here.

Figure 14:
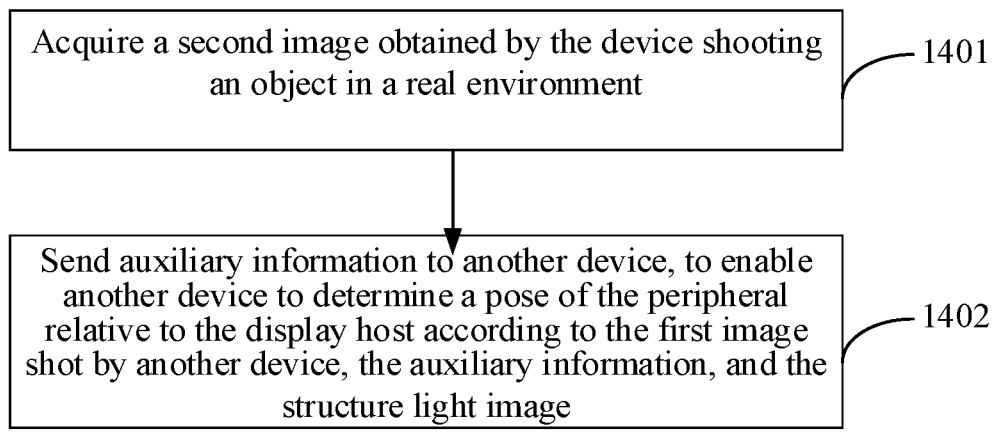
FIG. 14 is a flowchart of yet another positioning method provided by one or more embodiments of the present disclosure.

FIG. 14 is a flowchart of another positioning method provided by one or more embodiments of the present disclosure. The method is applied to any device in a display host and a peripheral. The method includes the following steps.

Step 1401, acquire a second image obtained by the device shooting an object in a real environment, where another device in the display host and peripheral is used for projecting a structure light image onto the object.

Step 1402, send auxiliary information to another device, where the auxiliary information includes: the second image, or two-dimensional position information of at least part of spatial position of multiple spatial positions in the second image, to enable another device to determine a pose of the peripheral relative to the display host according to the first image shot by another device, the auxiliary information, and the structure light image.

The multiple spatial positions are the multiple spatial positions correspond to multiple light patterns projected onto a surface of the object in the structure light image.

The specific implementation process, principles, and beneficial effects of the positioning method provided in the embodiment may refer to the aforementioned embodiments, and will not be repeated here.

Figure 15:
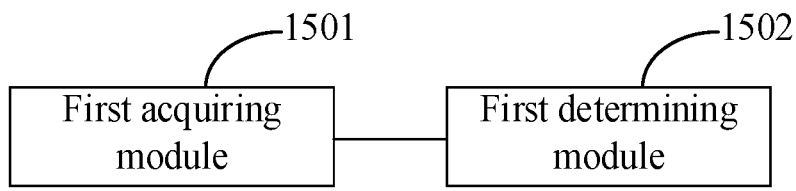
FIG. 15 is a structural block diagram of a positioning apparatus provided by one or more embodiments of the present disclosure.

Corresponding to the positioning method provided in the above embodiments, an embodiment of the present disclosure also provides a positioning apparatus. FIG. 15 is a structural block diagram of a positioning apparatus provided by one or more embodiments of the present disclosure. For ease of explanation, only the parts related to an embodiment of the present disclosures are shown. The apparatus is applied to a wearable display device including a display host and a peripheral, where the display host and/or the peripheral are used for projecting a structure light image onto an object in a real environment. Referring to FIG. 15, the device may include:

a first acquiring module 1501, configured to acquire an image obtained by the display host shooting the object, and an image obtained by the peripheral shooting the object; and a first determining module 1502, configured to determine, according to image obtained by shooting and the structure light image, a pose of the peripheral relative to the display host.

In an embodiment, the structure light image includes N light spots, the N light spots include N reference points, and N is a positive integer greater than or equal to 3; the first acquiring module 1501 is further configured to:

match a first image and a second image to determine N groups of feature points with matching relationships, where each group of feature points includes a first feature point located in the first image and a second feature point located in the second image, the first feature point and the second feature point in each group of feature points correspond to a same reference point, and different groups of feature points correspond to different reference points;

determine, based on position information of a respective first feature point in the first image, first position information of the reference point corresponding to the respective first feature point in a display host coordinate system;

determine, based on position information of a respective second feature point in the second image, second position information of the reference point corresponding to the respective second feature point in a peripheral coordinate system;

determine, based on the first position information of the N reference points in the display host coordinate system and the second position information of the N reference points in the peripheral coordinate system, a transformation matrix of the display host coordinate system and the peripheral coordinate system;

acquire first pose data of the peripheral in the peripheral coordinate system;

determine, based on the first pose data and the transformation matrix, the pose of the peripheral relative to the display host;

where the first feature point is an image of the reference point corresponding to the first feature point in the first image; the second feature point is an image of the reference point corresponding to the second feature point in the second image;

where the first image is an image shot by a device used for projecting the structure light image in the display host and the peripheral, and the second image is an image shot by another device.

In an embodiment, for each group of feature points, within a set range centered on the first feature point in the first image, a gradient change characteristic of a grayscale value of a pixel is a first characteristic, within the set range centered on the second feature point in the second image, the gradient change characteristic of a grayscale value of a pixel is a second characteristic, and the first characteristic is consistent with the second characteristic.

In an embodiment, the first determining module 1502 is further configured to:

determine, based on the position information of the respective first feature point in the first image, first relative position information between the reference point corresponding to the respective first feature point and the display host;

acquire third position information of the display host in the display host coordinate system;

determine, based on the first relative position information and the third position information, the first position information of a respective reference point in the display host coordinate system;

determine, based on the position information of the respective second feature point in the second image, second relative position information between the reference point corresponding to the respective second feature point and the display host;

acquire fourth position information of the display host in the display host coordinate system;

determine, based on the second relative position information and the fourth position information, the second position information of a respective reference point in the display host coordinate system.

The apparatus provided in the embodiment may be used to execute the technical solution of the embodiments shown in above FIG. 1 to FIG. 12, and the implementation principles and technical effects therebetween are similar, and which will not be repeated in the embodiment.

Figure 16:
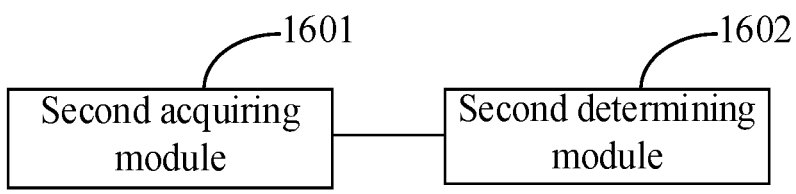
FIG. 16 is a structural block diagram of another positioning apparatus provided by one or more embodiments of the present disclosure.

FIG. 16 is a structural block diagram of another positioning apparatus provided by one or more embodiments of the present disclosure. The apparatus is applied to any device in the display host and peripheral, where the device is used to project a structure light image onto an object in a real environment. The apparatus includes:

a second acquiring module 1601, configured to acquire a first image obtained by the device shooting the object, and auxiliary information sent by another device in the display host and the peripheral, where the auxiliary information includes: a second image obtained by another device shooting the object, or two-dimensional position information of at least part of spatial position of multiple spatial positions in the second image;

a second determining module 1602, configured to determine, according to the first image, the auxiliary information, and the structure light image, a pose of the peripheral relative to the display host.

The multiple spatial positions are multiple spatial positions correspond to multiple light patterns in the structure light image projected onto a surface of the object.

The apparatus provided in the embodiment may be used to execute the technical solution of the embodiment shown in above FIG. 13, and the implementation principles and technical effects therebetween are similar, and which will not be repeated in the embodiment.

Figure 17:
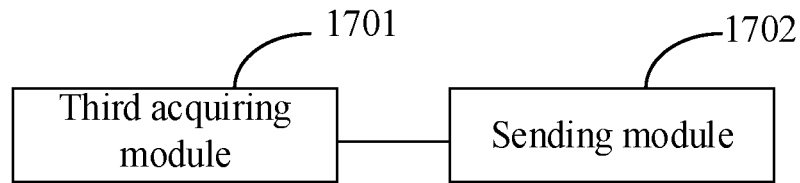
FIG. 17 is a structural block diagram of yet another positioning apparatus provided by one or more embodiments of the present disclosure.

FIG. 17 is a structural block diagram of yet another positioning apparatus provided by one or more embodiments of the present disclosure. The apparatus is applied to any device in the display host and peripherals. The apparatus includes:

a third acquiring module 1701, configured to acquire a second image obtained by the device shooting an object in a real environment, where another device in the display host and peripheral is used for projecting a structure light image onto the object;

a sending module 1702, configured to send auxiliary information to another device, where the auxiliary information includes: the second image, or two-dimensional position information of at least part of spatial position of multiple spatial positions in the second image, to enable another device to determine a pose of the peripheral relative to the display host according to the first image shot by another device, the auxiliary information, and the structure light image.

The multiple spatial positions are multiple spatial positions correspond to multiple light patterns in the structure light image projected onto a surface of the object.

The apparatus provided in the embodiment may be used to execute the technical solution of the embodiment shown in above FIG. 14, and the implementation principles and technical effects therebetween are similar, and which will not be repeated in the embodiment.

Figure 18:
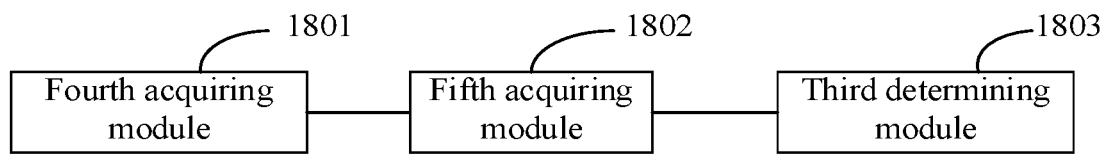
FIG. 18 is a structural block diagram of yet another positioning apparatus provided by one or more embodiments of the present disclosure.

FIG. 18 is a structural block diagram of yet another positioning apparatus provided by one or more embodiments of the present disclosure. The apparatus is applied to an extended reality device. The apparatus includes:

a fourth acquiring module 1801, configured to acquire a transformation matrix of a display host coordinate system corresponding to the display host and a peripheral coordinate system corresponding to the peripheral;

a fifth acquiring module 1802, configured to acquire second pose data of the peripheral in the peripheral coordinate system;

a third determining module 1803, configured to determine, based on the second pose data and the transformation matrix, first pose data of the peripheral in the display host coordinate system.

Further, the display host coordinate system is created based on environmental data collected by the display host, and the peripheral coordinate system is created based on the environmental data collected by the peripheral, the display host coordinate system and peripheral coordinate system are both bound to the user's environment.

Furthermore, the fourth acquiring module 1801 is configured to:

determine first position information of N reference points in an environment in a display host coordinate system and second position information of the N reference points in a peripheral coordinate system; N is a positive integer greater than or equal to 3;

determine, based on the first position information of N reference points in the display host coordinate system and the second position information of N reference points in the peripheral coordinate system, the transformation matrix of the display host coordinate system and the peripheral coordinate system.

Further, the fourth acquiring module 1801 is configured to:

use a display host to collect an image of an environment where the display host locates to obtain a first image;

use a peripheral to collect an image of an environment where the peripheral locates to obtain a second image;

match the first image and the second image to determine N groups of feature points with matching relationships, where each group of feature points includes a first feature point located in the first image and a second feature point located in the second image; the first feature point and the second feature point in each group of feature points correspond to a same reference point, and different groups of feature points correspond to different reference points;

determine, based on the position information of the respective first feature point in the first image, the first position information of the reference point corresponding to the respective first feature point in the display host coordinate system;

determine, based on the position information of the respective second feature point in the second image, the second position information of the reference point corresponding to the respective second feature point in the peripheral coordinate system.

Further, for each group of feature points, within a set range centered on the first feature point in the first image, a gradient change characteristic of a grayscale value of a pixel is a first characteristic, within the set range centered on the second feature point in the second image, a gradient change characteristic of a grayscale value of a pixel is a second characteristic, and the first characteristic is consistent with the second characteristic.

Further, an infrared signal emitter is installed on the display host and/or peripheral, which is used to form N light spots in the environment where the infrared signal emitter locates; N light spots are N reference points;

the first feature point is the image of the reference point corresponding to the first feature point in the first image;

the second feature point is the image of the reference point corresponding to the second feature point in the second image.

Further, the fourth acquiring module 1801 is configured to:

determine, based on the position information of the respective first feature point in the first image, first relative position information between the reference point corresponding to the respective first feature point and the display host;
acquire third position information of the display host in the display host coordinate system;
determine, based on the first relative position information and the third position information, the first position information of a respective reference point in the display host coordinate system;
determine, based on the position information of the respective second feature point in the second image, second relative position information between the reference point corresponding to the respective second feature point and the display host;
acquire fourth position information of the display host in the display host coordinate system;
determine, based on the second relative position information and the fourth position information, the second position information of a respective reference point in the display host coordinate system.

Further, if there are N infrared signal emitters installed on a display host, the infrared signal emitters are used to form N light spots in their environment; N light spots are N reference points;

the fourth acquiring module 1801 is configured to:
use a peripheral to collect an image of an environment where the peripheral locates to obtain a third image, where the third image includes images of N light spots;
match the infrared signal emitter with the image of N light spots in the third image to establish a matching relationship between a respective infrared signal emitter and the images of the light spots formed by the respective infrared signal emitter;
determine, based on pose data of a respective display host and a set position of a respective infrared signal emitter on the display host, first position information of the light spot formed by the respective infrared signal emitter in a display host coordinate system, respectively; and
determine, based on position information of the images of the light spots formed by the respective infrared signal emitter in the third image, second position information of a respective light spot in the peripheral coordinate system, respectively;
or,
if there are N infrared signal emitters installed on the peripheral, the infrared signal emitter is used to form N light spots in its environment; N light spots are N reference points;
the fourth acquiring module 1801 is configured to:
use a display host to collect an image of an environment where the display host locates to obtain a fourth image, where the fourth image includes images of N light spots;
match the infrared signal emitter with the image of N light spots in the fourth image to establish a matching relationship between a respective infrared signal emitter and the images of the light spots formed by the respective infrared signal emitter;
determine, based on position information of the images of the light spots formed by the respective infrared signal emitter in the fourth image, first position information of a respective light spot in the display host coordinate system, respectively; and
determine, based on pose data of a respective peripheral and a setting position of a respective infrared signal emitter on the peripheral, the second position information of the light spot formed by respective infrared signal emitter in the peripheral coordinate system, respectively.

The positioning apparatus of the extended reality device peripheral provided in an embodiment of the present disclosure may perform the steps in the positioning method of the extended reality device peripheral provided in an embodiment of the present disclosure, and has the execution steps and beneficial effects, which will not be repeated here.

Figure 19:
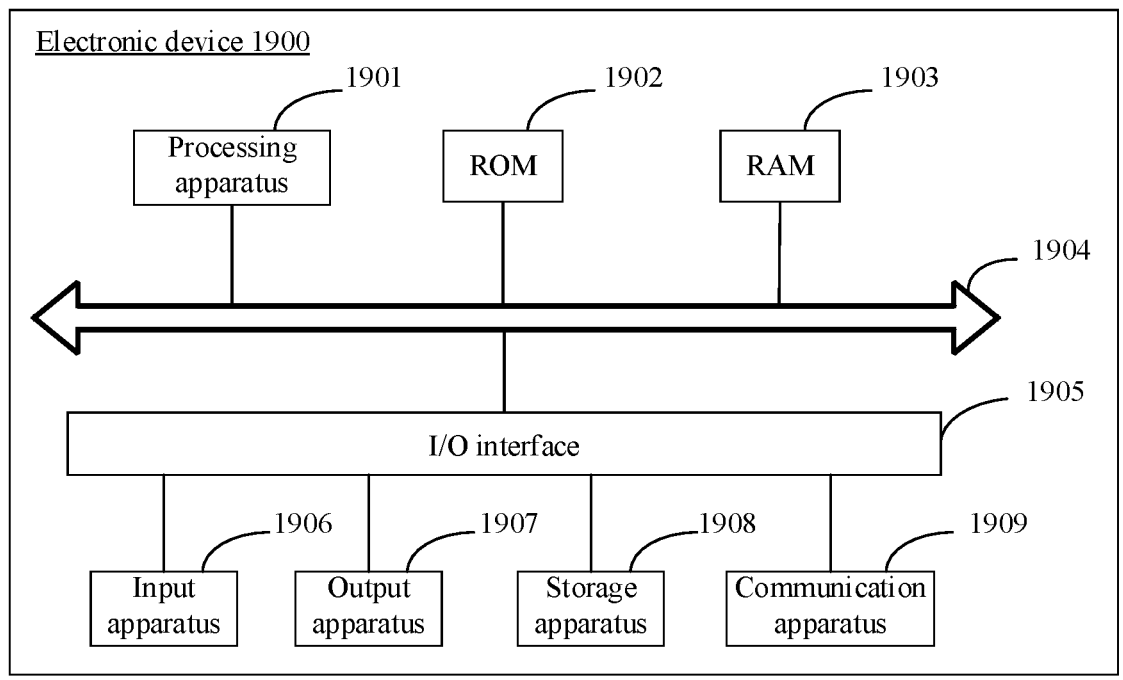
FIG. 19 is a structural block diagram of an electronic device provided by one or more embodiments of the present disclosure.

FIG. 19 is a structural block diagram of an electronic device provided by one or more embodiments of the present disclosure. Referring to FIG. 19, electronic device 1900 may be a terminal device or a server. The terminal device may include but are not limited to a mobile terminal, such as a mobile phone, laptop, digital radio receiver, personal digital assistant (PDA), portable android device (PAD), portable media player (PMP), vehicle terminal (such as vehicle navigation terminal), and a fixed terminal, such as a digital TV, desktop computer, and the like. The electronic device shown in FIG. 19 is only an example, which should not bring any limitation to the functions and the scope of use of the embodiment of the present disclosure.

As shown in FIG. 19, the electronic device 1900 may include a processing apparatus (such as a central processing unit, a graphics processor, etc.) 1901, which may execute various appropriate actions and processes according to a program stored in a read only memory (ROM) 1902 or a program loaded from a storage apparatus 1908 into a random access memory (RAM) 1903. In the RAM 1903, various programs and data required for an operation of the electronic device 1900 are also stored. The processing apparatus 1901, the ROM 1902, and the RAM 1903 are connected to each other through a bus 1904. An input/output (I/O) interface 1905 is also connected to the bus 1904.

Generally, the following apparatuses may be connected to the I/O interface 1905: an input apparatus 1906, including for example, a touch screen, a touch panel, a keyboard, a mouse, a camera, a microphone, an accelerometer, a gyroscope, or the like; an output apparatus 1907, including for example a liquid crystal display (LCD), a speaker, a vibrator, or the like; the storage apparatus 1908, including for example a magnetic tape, a hard disk, or the like; and a communication apparatus 1909. The communication apparatus 1909 may allow the electronic device 1900 to perform wireless or wired communication with other devices to exchange data. Although FIG. 19 shows the electronic device 1900 having various apparatuses, it should be understood that it is not required to implement or have all of the shown apparatuses. More or fewer apparatuses may be implemented or provided alternatively.

In particular, according to some embodiments of the present disclosure, the process described above with reference to the flowchart may be implemented as a computer software program. For example, some embodiments of the present disclosure include a computer program product, which includes a computer program carried on a computer readable medium, and the computer program contains program codes for executing the method shown in the flowchart. In some such embodiments, the computer program may be downloaded and installed from a network through the communication apparatus 1909, or installed from the storage apparatus 1908, or installed from the ROM 1902. When the computer program is executed by the processing apparatus 1901, the above-mentioned functions defined in the methods of some embodiments of the present disclosure are executed.

It should be noted that the computer readable medium described in some embodiments of the present disclosure may be a computer readable signal medium or a computer readable storage medium, or any combination of both. The computer readable storage medium may be, for example, but not limited to, an electrical, magnetic, optical, electromagnetic, infrared, or semiconductive system, apparatus or device, or any combination of the above. More specific examples of the computer readable storage medium may include, but are not limited to: an electrically connected portable computer disk with one or more wires, a hard disk, a random access memory (RAM), a read-only memory (ROM), an erasable programmable read-only memory (Electrical Programmable ROM, EPROM or flash memory), an optical fiber, a portable compact disc read-only memory (Compact Disc ROM, CD-ROM), an optical storage device, a magnetic storage device, or any suitable combination of the above. In the present disclosure, the computer readable storage medium may be any tangible medium in which a program is contained or stored, and the program may be used by or in combination with an instruction execution system, apparatus, or device. In the present disclosure, the computer readable signal medium may include a data signal propagated in a baseband or as a part of a carrier wave, and computer readable program codes are carried therein. This propagated data signal may adopt many forms, including but not limited to, an electromagnetic signal, an optical signal, or any suitable combination of the above. The computer readable signal medium may also be any computer readable media other than the computer readable storage medium. The computer readable signal medium may send, propagate, or transmit the program used by or in combination with the instruction execution system, apparatus, or device. The program codes contained on the computer readable medium may be transmitted by any suitable medium, including but not limited to: a wire, an optical cable, a RF (radio frequency), etc., or any suitable combination of the above.

The computer readable medium mentioned above may be included in the electronic device mentioned above; it may also exist separately without being assembled into the electronic device.

The above computer readable medium carries one or more programs, which, when executed by the electronic device, cause the electronic device to execute the method shown in the above embodiments.

The computer program codes for performing operations of some embodiments of the present disclosure may be written in one or more programming languages or a combination thereof. The programming languages include object-oriented programming languages—such as Java, Smalltalk, C++, and also include conventional procedural programming language—such as "C" language or similar programming language. The program codes may be executed entirely on a computer of a user, executed partly on a computer of a user, executed as an independent software package, partly executed on a computer of a user and partly executed on a remote computer, or entirely executed on a remote computer or a server. In a case where a remote computer is involved, the remote computer may be connected to the computer of the user through any kind of network—including the local area network (LAN) or the wide area network (WAN), or, it may be connected to an external computer (for example, being connected via the Internet with use of an Internet service provider).

The flowcharts and block diagrams in the accompanying drawings illustrate the architecture, functions, and operations of possible implementations of the system, method, and computer program product according to the embodiments of the present disclosure. In this point, each block in the flowcharts or block diagrams may represent a module, a program segment, or a part of codes, and the module, the program segment, or the part of codes contains one or more executable instructions for implementing a specified logical function. It should also be noted that, in some alternative implementations, the functions marked in the blocks may also occur in a different order from the order marked in the drawings. For example, two blocks shown one after another may actually be executed substantially in parallel, or sometimes may be executed in the reverse order, which depends on the functions involved. It should also be noted that, each block in the block diagrams and/or flowcharts, and a combination of the blocks in the block diagrams and/or flowcharts, may be implemented by a dedicated hardware-based system that performs the specified functions or operations, or may be implemented by a combination of dedicated hardware and computer instructions.

The units described in some embodiments of the present disclosure may be implemented in software or hardware. In some situations, the name of a unit does not constitute a limitation for the unit itself.

The functions described above in the context may be performed at least in part by one or more hardware logic components. For example, without limitation, exemplary types of hardware logic components that may be used include: a field programmable gate array (FPGA), an application specific integrated circuit (ASIC), application specific standard parts (ASSP), a system on chip (SOC), a complex programming logic device (CPLD), and the like.

In the context of the present disclosure, a machine readable medium may be a tangible medium that may contain or store programs for use by or in combination with an instruction execution system, apparatus or device. The machine readable medium may be a machine readable signal medium or a machine readable storage medium. The machine readable medium may include, but is not limited to, an electronic, magnetic, optical, electromagnetic, infrared, or semiconductor system, apparatus or device, or any suitable combination of the above. More specific examples of the machine readable storage medium will include an electrical connection based on one or more lines, a portable computer disk, a hard disk, a random access memory (RAM), a read only memory (ROM), an erasable programmable read only memory (EPROM or flash memory), an optical fiber, a portable compact disc read-only memory (CD-ROM), an optical storage device, a magnetic storage device, or any suitable combination of the above.

In a first aspect, according to one or more embodiments of the present disclosure, a positioning method is provided, the method is applied to a wearable display device including a display host and a peripheral, where the display host and/or the peripheral are used for projecting a structure light image onto an object in a real environment, and the method includes:

acquiring an image obtained by the display host shooting the object, and an image obtained by the peripheral shooting the object; and determining, according to image obtained by shooting and the structure light image, a pose of the peripheral relative to the display host.

According to one or more embodiments of the present disclosure, the determining, according to the image obtained by shooting and the structure light image, the pose of the peripheral relative to the display host includes:

determining, according to the structure light image and a first image, three-dimensional position information of multiple spatial positions corresponding to the multiple light patterns projected onto a surface of the object;

determining two-dimensional position information of at least part of spatial position of the multiple spatial positions in a second image;

determining, according to the three-dimensional position information of the multiple spatial positions and the two-dimensional position information corresponding to the at least part of spatial position, the pose of the peripheral relative to the display host;

where the first image is an image shot by a device used for projecting the structure light image in the display host and the peripheral, and the second image is an image shot by another device.

According to one or more embodiments of the present disclosure, the light pattern includes a point;

the determining, according to the three-dimensional position information of the multiple spatial positions and the two-dimensional position information corresponding to the at least part of spatial position, the pose of the peripheral relative to the display host includes:

inputting the three-dimensional position information of the multiple spatial positions and the two-dimensional position information corresponding to the at least part of spatial position into a pose positioning model to obtain the pose of the peripheral relative to the display host.

According to one or more embodiments of the present disclosure, the method further includes:

randomly generating multiple depths, simulating virtual objects formed by projecting the structure light image onto the multiple depths to obtain the three-dimensional position information corresponding to the multiple spatial positions;

simulating the peripheral to shoot the at least part of spatial position of the multiple spatial positions in at least one pose to obtain two-dimensional position information of the at least part of spatial position in an image shot by the peripheral;

generating corresponding training data for respective pose, wherein the training data comprises a pose, the three-dimensional position information of the multiple spatial positions, and the two-dimensional position information of the at least part spatial positions in the pose; and training, based on the generated training data, a neural network model to obtain the pose positioning model.

According to one or more embodiments of the present disclosure, the light pattern includes a line segment; the determining, according to the three-dimensional position information of the multiple spatial positions and the two-dimensional position information corresponding to the at least part of spatial position, the pose of the peripheral relative to the display host includes:

solving, according to the two-dimensional position information corresponding to the at least part of spatial position and three-dimensional position information of the multiple spatial positions, a transformation equation to obtain the pose of the peripheral relative to the display host;

where the three-dimensional position information of the multiple spatial positions is three-dimensional position information of the multiple spatial positions in a display host coordinate system;

where the transformation equation is used to represent a relationship between the three-dimensional position information of the multiple spatial positions in a peripheral coordinate system and corresponding two-dimensional position information;

where the three-dimensional position information of the multiple spatial positions in the peripheral coordinate system is determined by the three-dimensional position information of the multiple spatial positions in the display host coordinate system and the pose of the peripheral relative to the display host.

According to one or more embodiments of the present disclosure, the solving, according to the two-dimensional position information corresponding to the at least part of spatial position and the three-dimensional position information, the transformation equation to obtain the pose of the peripheral relative to the display host includes:

if projections corresponding to at least three line segments in the second image are all straight lines, solving, according to a spatial straight line equation corresponding to the at least three line segments and a plane straight line equation corresponding to the at least three line segments in the second image, a line conversion equation to determine the pose of the peripheral relative to the display host; and/or, if a projection corresponding to at least one line segment in the second image is a non-straight line, solving, according to coordinates of multiple points in the non-straight line, a coordinate conversion equation to determine the pose of the peripheral relative to the display host, where the multiple points include inflection points and/or endpoints of the non-straight line.

According to one or more embodiments of the present disclosure, after the determining the pose of the peripheral relative to the display host, the method further includes:

predicting, according to a historical pose of the peripheral relative to the display host and a pose determined at a current moment, a pose of the peripheral relative to the display host at a next moment;

determining, according to a predicted pose, a shooting range of the peripheral at the next moment, and performing, according to the shooting range, at least one of the following:

generating a structure light image for the next moment;

adjusting a projection angle of a projection apparatus in the display host or the peripheral at the next moment, where the projection apparatus is used for projecting the structure light image;

if multiple projection apparatuses with different projection ranges set on the display host or the peripheral, determining, according to the shooting range, a projection apparatus to be enabled at the next moment.

In a second aspect, according to one or more embodiments of the present disclosure, a positioning method is provided, the method is applied to any device in a display host and a peripheral, where the device is used for projecting a structure light image onto an object in a real environment, and the method includes:

acquiring a first image obtained by the device shooting the object, and auxiliary information sent by another device in the display host and the peripheral, where the auxiliary information includes: a second image obtained by another device shooting the object, or two-dimensional position information of at least part of spatial position of multiple spatial positions in the second image;

determining, according to the first image, the auxiliary information, and the structure light image, a pose of the peripheral relative to the display host;

where the multiple spatial positions are multiple spatial positions correspond to multiple light patterns in the structure light image projected onto a surface of the object.

In a third aspect, according to one or more embodiments of the present disclosure, a positioning method is provided, the method is applied to any device in a display host and a peripheral; and the method includes:

acquiring a second image obtained by the device shooting an object in a real environment, where another device in the display host and peripheral is used for projecting a structure light image onto the object;

sending auxiliary information to another device, where the auxiliary information includes: the second image, or two-dimensional position information of at least part of spatial position of multiple spatial positions in the second image, to enable another device to determine a pose of the peripheral relative to the display host according to the first image shot by another device, the auxiliary information, and the structure light image;

where the multiple spatial positions are multiple spatial positions correspond to multiple light patterns in the structure light image projected onto a surface of the object.

In a fourth aspect, according to one or more embodiments of the present disclosure, a positioning apparatus is provided, the apparatus is applied to a wearable display device including a display host and a peripheral, where the display host and/or the peripheral are used for projecting a structure light image onto an object in a real environment, and the apparatus includes:

a first acquiring module, configured to acquire an image obtained by the display host shooting the object, and an image obtained by the peripheral shooting the object; and a first determining module, configured to determine, according to image obtained by shooting and the structure light image, a pose of the peripheral relative to the display host.

In a fifth aspect, according to one or more embodiments of the present disclosure, a positioning apparatus is provided, the apparatus is applied to any device in a display host and a peripheral, where the device is used for projecting a structure light image onto an object in a real environment, and the apparatus includes:

a second acquiring module, configured to acquire a first image obtained by the device shooting the object, and auxiliary information sent by another device in the display host and the peripheral, where the auxiliary information includes: a second image obtained by another device shooting the object, or two-dimensional position information of at least part of spatial position of multiple spatial positions in the second image;

a second determining module, configured to determine, according to the first image, the auxiliary information, and the structure light image, a pose of the peripheral relative to the display host;

where the multiple spatial positions are multiple spatial positions correspond to multiple light patterns in the structure light image projected onto a surface of the object.

In a sixth aspect, according to one or more embodiments of the present disclosure, a positioning apparatus is provided, the apparatus is applied to any device in a display host and a peripheral, and the apparatus includes:

a third acquiring module, configured to acquire a second image obtained by the device shooting an object in a real environment, where another device in the display host and peripheral is used for projecting a structure light image onto the object;

a sending module, configured to send auxiliary information to another device, where the auxiliary information includes: the second image, or two-dimensional position information of at least part of spatial position of multiple spatial positions in the second image, to enable another device to determine a pose of the peripheral relative to the display host according to the first image shot by another device, the auxiliary information, and the structure light image;

where the multiple spatial positions are multiple spatial positions correspond to multiple light patterns in the structure light image projected onto a surface of the object.

In a seventh aspect, according to one or more embodiments of the present disclosure, an electronic device is provided, including: a memory and at least one processor;

the memory stores computer execution instructions;

the at least one processor executes computer execution instructions stored in the memory to enable the at least one processor to execute the positioning methods according to any one of the aforementioned.

In an eighth aspect, according to one or more embodiments of the present disclosure, a computer readable storage medium is provided, where when a processor executes computer execution instructions, the positioning methods according to any one of the aforementioned are implemented.

In the ninth aspect, according to one or more embodiments of the present disclosure, a computer program product is provided, including computer programs, where when the computer programs are executed by a processor, the positioning methods according to any one of the aforementioned are implemented.

The above description is only preferred embodiments of the present disclosure and an illustration of the applied technical principles. Those skilled in the art should understand that, the disclosure scope involved in the present disclosure is not limited to the technical solutions formed by the specific combination of the above technical features, but also covers other technical solutions formed by the arbitrary combination of the above technical features or their equivalent features without departing from the above disclosure concept, for example, a technical solution formed by replacing the above features with technical features with similar functions disclosed (but not limited to) in the present disclosure.

In addition, although each operation is described in a specific order, this should not be understood as requiring these operations to be performed in the specific order or in a sequential order shown. Under certain circumstances, multitasking and parallel processing may be advantageous. Similarly, although several specific implementation details are included in the above discussion, these should not be interpreted as limiting the scope of the present disclosure. Certain features described in the context of a single embodiment may also be implemented in combination in the single embodiment. Conversely, various features described in the context of a single embodiment may also be implemented in multiple embodiments individually or in any suitable sub combination.

Although the subject matter has been described in language specific to structural features and/or method logical actions, it should be understood that the subject matter defined in the appended claims is not limited to the specific features or actions described above. On the contrary, the specific features and actions described above are only exemplary forms for implementing the claims.

The invention claimed is:

1. A positioning method, applied to a wearable display device, comprising a display host and a peripheral, wherein the display host and/or the peripheral are used for projecting a structure light image onto an object in a real environment, and the method comprises:
acquiring:
a first image obtained by the display host shooting the object, and a second image obtained by the peripheral shooting the object, or
a second image obtained by the display host shooting the object, and a first image obtained by the peripheral shooting the object; and
determining, according to the first image and the second image obtained by shooting and the structure light image, a pose of the peripheral relative to the display host, wherein
the structure light image comprises multiple light patterns,
the determining, according to the first image and the second image obtained by shooting and the structure light image, the pose of the peripheral relative to the display host comprises:
determining, according to the structure light image and the first image, three-dimensional position information of multiple spatial positions corresponding to the multiple light patterns projected onto a surface of the object;
determining two-dimensional position information of at least part of spatial position of the multiple spatial positions in the second image; and
determining, according to the three-dimensional position information of the multiple spatial positions and the two-dimensional position information corresponding to the at least part of spatial position, the pose of the peripheral relative to the display host, and
the first image is an image shot by a device used for projecting the structure light image in the display host and the peripheral, and the second image is an image shot by another device.

2. The method according to claim 1, wherein the light pattern comprises a point; and
the determining, according to the three-dimensional position information of the multiple spatial positions and the two-dimensional position information corresponding to the at least part of spatial position, the pose of the peripheral relative to the display host comprises:
inputting the three-dimensional position information of the multiple spatial positions and the two-dimensional position information corresponding to the at least part of spatial position into a pose positioning model to obtain the pose of the peripheral relative to the display host.

3. The method according to claim 2, further comprising:
randomly generating multiple depths, simulating virtual objects formed by projecting the structure light image onto the multiple depths to obtain the three-dimensional position information corresponding to the multiple spatial positions;
simulating the peripheral to shoot the at least part of spatial position of the multiple spatial positions in at least one pose to obtain two-dimensional position information of the at least part of spatial position in an image shot by the peripheral;
generating corresponding training data for respective pose, wherein the training data comprises a pose, the three-dimensional position information of the multiple spatial positions, and the two-dimensional position information of the at least part spatial positions in the pose; and
training, based on the generated training data, a neural network model to obtain the pose positioning model.

4. The method according to claim 1, wherein
the light pattern comprises a line segment;
the determining, according to the three-dimensional position information of the multiple spatial positions and the two-dimensional position information corresponding to the at least part of spatial position, the pose of the peripheral relative to the display host comprises:
solving, according to the two-dimensional position information corresponding to the at least part of spatial position and the three-dimensional position information of the multiple spatial positions, a transformation equation to obtain the pose of the peripheral relative to the display host;
the three-dimensional position information of the multiple spatial positions is three-dimensional position information of the multiple spatial positions in a display host coordinate system;
the transformation equation is used to represent a relationship between the three-dimensional position information of the multiple spatial positions in a peripheral coordinate system and corresponding two-dimensional position information; and
the three-dimensional position information of the multiple spatial positions in the peripheral coordinate system is determined by the multiple three-dimensional position information of the spatial positions in the display host coordinate system and the pose of the peripheral relative to the display host.

5. The method according to claim 4, wherein the solving, according to the two-dimensional position information corresponding to the at least part of spatial position and the three-dimensional position information, the transformation equation to obtain the pose of the peripheral relative to the display host comprises:
if projections corresponding to at least three line segments in the second image are all straight lines, solving, according to a spatial straight line equation corresponding to the at least three line segments and a plane straight line equation corresponding to the at least three line segments in the second image, a line conversion equation to determine the pose of the peripheral relative to the display host; and/or,
if a projection corresponding to at least one line segment in the second image is a non-straight line, solving, according to coordinates of multiple points in the non-straight line, a coordinate conversion equation to determine the pose of the peripheral relative to the display host, wherein the multiple points comprise inflection points and/or endpoints of the non-straight line.

6. The method according to claim 1, wherein after the determining the pose of the peripheral relative to the display host, the method further comprises:

predicting, according to a historical pose of the peripheral relative to the display host and a pose determined at a current moment, a pose of the peripheral relative to the display host at a next moment;

determining, according to a predicted pose, a shooting range of the peripheral at the next moment, and performing, according to the shooting range, at least one of the following:

generating a structure light image for the next moment;

adjusting a projection angle of a projection apparatus in the display host or the peripheral at the next moment, wherein the projection apparatus is used for projecting the structure light image; and if multiple projection apparatuses with different projection ranges set on the display host or the peripheral, determining, according to the shooting range, a projection apparatus to be enabled at the next moment.

7. The method according to claim 1, wherein
the structure light image comprises N light spots,
the N light spots comprise N reference points,
N is a positive integer greater than or equal to 3,
the determining, according to the first image and the second image obtained by shooting and the structure light image, the pose of the peripheral relative to the display host comprises:
matching the first image and the second image to determine N groups of feature points with matching relationships, wherein each group of feature points comprise a first feature point located in the first image and a second feature point located in the second image, the first feature point and the second feature point in each group of feature points correspond to a same reference point, and different groups of feature points correspond to different reference points;
determining, based on position information of a respective first feature point in the first image, first position information of the reference point corresponding to the respective first feature point in a display host coordinate system;
determining, based on position information of a respective second feature point in the second image, second position information of the reference point corresponding to the respective second feature point in a peripheral coordinate system;
determining, based on the first position information of the N reference points in the display host coordinate system and the second position information of the N reference points in the peripheral coordinate system, a transformation matrix of the display host coordinate system and the peripheral coordinate system;
acquiring first pose data of the peripheral in the peripheral coordinate system; and
determining, based on the first pose data and the transformation matrix, the pose of the peripheral relative to the display host,
the first feature point is an image of the reference point corresponding to the first feature point in the first image; the second feature point is an image of the reference point corresponding to the second feature point in the second image, and
wherein the first image is an image shot by a device used for projecting the structure light image in the display host and the peripheral, and the second image is an image shot by another device.

8. The method according to claim 7, wherein,
for each group of feature points, within a set range centered on the first feature point in the first image, a gradient change characteristic of a grayscale value of a pixel is a first characteristic, within the set range centered on the second feature point in the second image, a gradient change characteristic of a grayscale value of a pixel is a second characteristic, and the first characteristic is consistent with the second characteristic.

9. The method according to claim 7, wherein
the determining, based on the position information of the respective first feature point in the first image, the first position information of the reference point corresponding to the respective first feature point in the display host coordinate system comprises:
determining, based on the position information of the respective first feature point in the first image, first relative position information between the reference point corresponding to the respective first feature point and the display host;
acquiring third position information of the display host in the display host coordinate system; and
determining, based on the first relative position information and the third position information, the first position information of a respective reference point in the display host coordinate system, and
the determining, based on the position information of the respective second feature point in the second image, the second position information of the reference point corresponding to the respective second feature point in the peripheral coordinate system comprises:
determining, based on the position information of the respective second feature point in the second image, second relative position information between the reference point corresponding to the respective second feature point and the display host;
acquiring fourth position information of the display host in the display host coordinate system; and
determining, based on the second relative position information and the fourth position information, the second position information of a respective reference point in the display host coordinate system.

10. A positioning apparatus, applied to a wearable display device comprising a display host and a peripheral, wherein the display host and/or the peripheral are used for projecting a structure light image onto an object in a real environment, the apparatus comprises a memory and at least one processor;
the memory stores computer execution instructions; the at least one processor executes computer execution instructions stored in the memory to enable the at least one processor to:
acquire:
a first image obtained by the display host shooting the object, and a second image obtained by the peripheral shooting the object, or
a second image obtained by the display host shooting the object, and a first image obtained by the peripheral shooting the object; and
determine, according to the first image and the second image obtained by shooting and the structure light image, a pose of the peripheral relative to the display host, wherein
the structure light image comprises multiple light patterns, the at least one processor is further configured to:
  determine, according to the structure light image and the first image, three-dimensional position information of multiple spatial positions corresponding to the multiple light patterns projected onto a surface of the object;
  determine two-dimensional position information of at least part of spatial position of the multiple spatial positions in the second image; and
  determine, according to the three-dimensional position information of the multiple spatial positions and the two-dimensional position information corresponding to the at least part of spatial position, the pose of the peripheral relative to the display host, and
  the first image is an image shot by a device used for projecting the structure light image in the display host and the peripheral, and the second image is an image shot by another device.

11. The apparatus according to claim 10, wherein the light pattern comprises a point; the at least one processor is further configured to:
  input the three-dimensional position information of the multiple spatial positions and the two-dimensional position information corresponding to the at least part of spatial position into a pose positioning model to obtain the pose of the peripheral relative to the display host.

12. The apparatus according to claim 11, wherein the at least one processor is further configured to:
  randomly generate multiple depths, simulate virtual objects formed by projecting the structure light image onto the multiple depths to obtain the three-dimensional position information corresponding to the multiple spatial positions;
  simulate the peripheral to shoot the at least part of spatial position of the multiple spatial positions in at least one pose to obtain two-dimensional position information of the at least part of spatial position in an image shot by the peripheral;
  generate corresponding training data for respective pose, wherein the training data comprise a pose, the three-dimensional position information of the multiple spatial positions, and the two-dimensional position information of the at least some spatial positions in the pose; and
  train, based on the generated training data, a neural network model to obtain the pose positioning model.

13. The apparatus according to claim 10, wherein
the light pattern comprises a line segment; the at least one processor is further configured to:
  solve, according to the two-dimensional position information corresponding to the at least part of spatial position and the three-dimensional position information of the multiple spatial positions, a transformation equation to obtain the pose of the peripheral relative to the display host;
the three-dimensional position information of the multiple spatial positions is three-dimensional position information of the multiple spatial positions in a display host coordinate system;
the transformation equation is used to represent a relationship between the three-dimensional position information of the multiple spatial positions in a peripheral coordinate system and corresponding two-dimensional position information; and
the three-dimensional position information of the multiple spatial positions in the peripheral coordinate system is determined by the three-dimensional position information of the multiple spatial positions in the display host coordinate system and the pose of the peripheral relative to the display host.

14. The apparatus according to claim 13, wherein the at least one processor is further configured to:
  if projections corresponding to at least three line segments in the second image are all straight lines, solve, according to a spatial straight line equation corresponding to the at least three line segments and a plane straight line equation corresponding to the at least three line segments in the second image, a line conversion equation to determine the pose of the peripheral relative to the display host; and/or,
  if a projection corresponding to at least one line segment in the second image is a non-straight line, solve, according to coordinates of multiple points in the non-straight line, a coordinate conversion equation to determine the pose of the peripheral relative to the display host, wherein the multiple points comprise an inflection point and/or an endpoint of the non-straight line.

15. The apparatus according to claim 10, wherein the at least one processor is further configured to:
  predict, according to a historical pose of the peripheral relative to the display host and a pose determined at a current moment, a pose of the peripheral relative to the display host at a next moment;
  determine, according to a predicted pose, a shooting range of the peripheral at the next moment, and perform, according to the shooting range, at least one of the following:
  generate a structure light image for the next moment;
  adjust a projection angle of a projection apparatus in the display host or the peripheral at the next moment, wherein the projection apparatus is used for projecting the structure light image; and
  if multiple projection apparatuses with different projection ranges set on the display host or the peripheral, determine, according to the shooting range, a projection apparatus to be enabled at the next moment.

16. The apparatus according to claim 10, wherein
the structure light image comprises N light spots,
the N light spots comprise N reference points,
N is a positive integer greater than or equal to 3,
the at least one processor is configured to:
  match the first image and the second image to determine N groups of feature points with matching relationships, wherein each group of feature points comprise a first feature point located in the first image and a second feature point located in the second image, the first feature point and the second feature point in each group of feature points correspond to a same reference point, and different groups of feature points correspond to different reference points;
  determine, based on position information of a respective first feature point in the first image, first position information of the reference point corresponding to the respective first feature point in a display host coordinate system;
  determine, based on position information of a respective second feature point in the second image, second position information of the reference point corresponding to the respective second feature point in a peripheral coordinate system;

determine, based on the first position information of the N reference points in the display host coordinate system and the second position information of the N reference points in the peripheral coordinate system, a transformation matrix of the display host coordinate system and the peripheral coordinate system;

acquire first pose data of the peripheral in the peripheral coordinate system; and determine, based on the first pose data and the transformation matrix, the pose of the peripheral relative to the display host, the first feature point is an image of the reference point corresponding to the first feature point in the first image; the second feature point is an image of the reference point corresponding to the second feature point in the second image, and the first image is an image shot by a device used for projecting the structure light image in the display host and the peripheral, and the second image is an image shot by another device.

17. The apparatus according to claim 10, wherein for each group of feature points, within a set range centered on the first feature point in the first image, a gradient change characteristic of a grayscale value of a pixel is a first characteristic, within the set range centered on the second feature point in the second image, a gradient change characteristic of a grayscale value of a pixel is a second characteristic, and the first characteristic is consistent with the second characteristic;

the at least one processor is further configured to:

determine, based on the position information of the respective first feature point in the first image, first relative position information between the reference point corresponding to the respective first feature point and the display host;

acquire third position information of the display host in the display host coordinate system;

determine, based on the first relative position information and the third position information, the first position information of a respective reference point in the display host coordinate system;

determine, based on the position information of the respective second feature point in the second image, second relative position information between the reference point corresponding to the respective second feature point and the display host;

acquire fourth position information of the display host in the display host coordinate system; and determine, based on the second relative position information and the fourth position information, the second position information of a respective reference point in the display host coordinate system.

18. A non-transitory computer readable storage medium, having computer execution instructions stored thereon, wherein when a processor executes computer execution instructions, following steps are executed:

acquiring:

a first image obtained by a display host shooting an object, and a second image obtained by a peripheral shooting the object, or a second image obtained by the display host shooting the object, and a first image obtained by the peripheral shooting the object; and determining, according to the first image and the second image obtained by shooting and a structure light image, a pose of the peripheral relative to the display host, the display host and/or the peripheral are used for projecting the structure light image onto the object in a real environment, the structure light image comprises multiple light patterns, the determining, according to the first image and the second image obtained by shooting and the structure light image, the pose of the peripheral relative to the display host comprises:

determining, according to the structure light image and the first image, three-dimensional position information of multiple spatial positions corresponding to the multiple light patterns projected onto a surface of the object;

determining two-dimensional position information of at least part of spatial position of the multiple spatial positions in the second image; and determining, according to the three-dimensional position information of the multiple spatial positions and the two-dimensional position information corresponding to the at least part of spatial position, the pose of the peripheral relative to the display host, and the first image is an image shot by a device used for projecting the structure light image in the display host and the peripheral, and the second image is an image shot by another device.

* * * * *